US006792162B1

(12) United States Patent
Edgar

(10) Patent No.: US 6,792,162 B1
(45) Date of Patent: Sep. 14, 2004

(54) METHOD AND APPARATUS TO AUTOMATICALLY ENHANCE THE QUALITY OF DIGITAL IMAGES BY MEASURING GRAIN TRACE MAGNITUDES

(75) Inventor: Albert D. Edgar, Austin, TX (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/551,486

(22) Filed: Apr. 18, 2000

Related U.S. Application Data

(60) Provisional application No. 60/150,148, filed on Aug. 20, 1999.

(51) Int. Cl.[7] ............................................. G06T 5/00
(52) U.S. Cl. ................................................. 382/275
(58) Field of Search ........................ 382/100, 112, 382/254, 275, 286; 348/96

(56) References Cited

U.S. PATENT DOCUMENTS

| | | | |
|---|---|---|---|
| 4,677,465 A | 6/1987 | Alkofer | 358/80 |
| 4,937,720 A | 6/1990 | Kirchberg | 363/41 |
| 5,010,401 A | 4/1991 | Murakami et al. | 358/136 |
| 5,047,968 A | 9/1991 | Carrington et al. | 364/574 |
| 5,291,286 A | 3/1994 | Murakami et al. | 348/469 |
| 5,561,611 A | 10/1996 | Avinash | 364/553 |
| 5,565,931 A | 10/1996 | Girod | 348/675 |
| 5,729,631 A | 3/1998 | Wober et al. | 382/232 |
| 6,055,340 A * | 4/2000 | Nagao | 382/261 |
| 6,373,992 B1 * | 4/2002 | Nagao | 382/266 |
| 6,415,053 B1 * | 7/2002 | Norimatsu | 382/199 |
| 6,667,815 B1 * | 12/2003 | Nagao | 358/1.9 |

FOREIGN PATENT DOCUMENTS

| | | | | |
|---|---|---|---|---|
| EP | 0 569 142 A1 * | 11/1993 | | H04N/5/253 |
| EP | 0 816 833 A2 * | 1/1998 | | G01N/21/88 |
| WO | WO 90/01240 A1 * | 2/1990 | | H04N/1/40 |
| WO | WO 91/09493 A1 * | 6/1991 | | H04N/5/217 |
| WO | WO 98/31142 A1 | 7/1998 | | H04N/5/253 |

OTHER PUBLICATIONS

M. Doyle, et al., "Adaptive Fourier Threshold Filtering: A Method to Reduce Noise and Incoherent Artifacts in High Resolution Cardiac Images", *Magnetic Resonance in Medicine*, vol. 31, No. 5, pp. 546–550.
B. Aiazzi, et al., "A Robust Method for Parameter Estimation of Signal–Dependent Noise Models in Digital Images", IEEE, pp. 601–604, Jul. 2, 1977.
Aggelos K. Katsaggelos, et al., "A Regularized Iterative Image Restoration Algorithm", *IEEE Transactions On Signal Processing*, vol. 39, No. 4, pp. 914–929, Apr. 1991.
XP–000780652: Til Aach, et al., "Anisotropic Spectral Magnitude Estimation Filters for Noise Reduction and Image Enhancement", *IEEE Proc. Int. Cont. on Image Processing*, pp. 335–338, Sep. 16, 1996.
Rangaraj M. Rangayyan, et al., "Adaptive–neighborhood filtering of images corrupted by signal–dependent noise", *Applied Optics*, vol. 37, No. 20, Jul. 10, 1998.
Mei Yu, et al., "New Adaptive Vector Filter Based on Noise Estimate", *IEICE Transaction Fundamentals*, vol. E82–A, No. 6, pp. 911–919, Jun. 1999.
J. N. Lin et al., "2–D Adaptive Volterra Filter For 2–D Nonlinear Channel Equalisation and Image Restoration", *Electronics Letters*, vol. 28, No. 2, pp. 180–182, Jan. 16, 1992.

* cited by examiner

*Primary Examiner*—Andrew W. Johns
(74) *Attorney, Agent, or Firm*—Baker Botts; David A. Novais

(57) ABSTRACT

One aspect of the invention is a method of automatically enhancing a digital image. The magnitudes of grain traces are measured in at least two segments in the digital negative and the digital negative is enhanced using the magnitudes of the grain traces measured in the at least two segments.

83 Claims, 8 Drawing Sheets

METHOD AND APPARATUS TO AUTOMATICALLY ENHANCE THE QUALITY OF DIGITAL IMAGES BY MEASURING GRAIN TRACE MAGNITUDES

CROSS REFERENCE TO RELATED APPLICATIONS

This application claims the benefit of U.S. Provisional Application Serial No. 60/150,148, filed Aug. 20, 1999 by Albert Edgar, and entitled, "Method and Apparatus to Automatically Enhance the Quality of Digital Images".

This application is related to U.S. Pat. No. 6,687,414, issued on Feb. 3, 2004 by Albert Edgar, entitled, "Method and System for Normalizing a Plurality of Singles Having a Shared Component".

This application is related to U.S. application Ser. No. 09/551,785, filed on Apr. 18, 2000 by Albert Edgar, entitled, "Method and System for Enhancing Digital Images".

TECHNICAL FIELD OF THE INVENTION

The present invention relates to image processing and more specifically to the enhancement of digital images.

BACKGROUND OF THE INVENTION

Digital images, such as scanned photographic images, medical images, satellite images, etc. often contain undesirable noise components. For example, photographic film, such as silver-halide film, contains grains held on a substrate, such as silver-halide, as part of its physical makeup. The characteristics of these grains are a function of the type and format of the film, with faster-speed and smaller-format film typically exhibiting more graininess. It will be understood by those skilled in the art, that silver-halide film refers to photographic film that has used silver halide as the light-sensitive agent. In most existing silver-halide films, the developed silver is turned through coupling agents into a dye image, and the silver is washed out of the film. However, after the wash such films are still commonly called silver-halide films, because their action is based on silver halide.

Color film generally comprises a blue layer, a green layer, a red layer, an antihalation layer, and a transparent substrate. In developed color film, each of the blue, green, and red layers contain dyes that are used to represent blue, green, and red colors in the development process. These dyes couple to developed areas of the film that correspond to developed silver grains. For each layer, the more silver grains that develop in any given area of the image, the greater will be the resulting density of dye in that area.

Grain sizes tend to vary randomly: certain grains are small, certain grains are large, and still other grains have sizes that are in between. During the development process, the grains that were exposed to the most light are the first to develop, and other grains develop as the development process continues. Those areas in which the most grains develop for a given layer will have the greatest density of dye. Each layer of the film has its own random and unique pattern of grain makeup, so that none of the patterns of the different layers are substantially alike. A positive film or a print of an image will also have a grain pattern.

Because graininess may have a deleterious impact on the quality of a photographic image, it is conventional practice in photography to avoid graininess in photographic images as much as possible, for example by using films with slower speeds and larger formats. Unfortunately, many situations exist where it is not possible to use these kinds of film. Also, millions of films with a high degree of graininess have already been processed over the last century. Furthermore, as film ages it tends to decay physically, which can cause distortions that affect its graininess and distort color.

Digital images may be created by scanning negatives, transparencies, or printed photographic images. The quality of such a digital image depends in part on the characteristics of the film image. For example, a digital image captured from a film image will often contain traces of the grains in the film, which comprise most of the "noise" or non-image deviations from image in the digital image. Digital images also often reflect any distortions present in the film itself. The higher the resolution of the scanning, the more grain traces and distortions will be captured in the digital image.

Many scanners modify colors and densities using gamma corrections that affect the perception of graininess. For example, a digital image produced by a scanner attempting to increase shadow contrast to overcome image underexposure will produce an image with amplified shadow grain traces relative to highlight grain traces. For example, in the case of an image of a tree against the sky, the digital image may have areas of dark shadows that have more grain traces than areas of the bright sky. Similarly, the digital image may contain areas of low-detail sky with large numbers of grain traces and areas of high-detail leaves with low numbers of traces. In other words, the range of values for grain traces in these digital images tends to fluctuate widely across intensity. In addition, a scanner may blur, i.e. subdue the high frequency content, image detail or attempt to overcome this blurring by sharpening, i.e. boosting the high frequency content, image detail. In both cases the grain traces are affected in relation to frequency, along with the image. This kind of digital image can be called "un-normalized" with respect to grain traces, and it is also often visually displeasing. This is because the human eye tends to focus on the areas in an image that have the highest amount of grain traces and to visually associate those same amounts to areas that actually have fewer grain traces.

Although one can attempt to improve the quality of a scanned image, such improvements can often only be obtained through labor-intensive alterations, which require a person of relatively high skill to subjectively determine what characteristics should be altered to improve the quality of the final image. As a result, because each image may be individually operated upon, the improvement process is time consuming and improvement of a large number of images may be impractical. Accordingly, another method of enhancing digital images is needed that can enhance a digital image automatically.

SUMMARY OF THE INVENTION

Briefly summarized, one aspect of the invention is a method of automatically enhancing a digital image. The magnitudes of grain traces are measured in at least two segments in the digital negative and the digital negative is enhanced using the magnitudes of the grain traces measured in the at least two segments.

The invention has several important technical advantages. Various embodiments of the invention may have none, one, some, or all of these advantages as well as additional advantages. The invention can be used to automatically enhance a digital image with respect to grain traces (noise). Such enhancement may be desirable for use with scanned photographic images. The invention allows automatic calculation of correction arrays for the digital image to correct uneven grain trace distribution with respect to intensity and frequency. Such arrays may be useful to normalize the grain traces in relation to pixel intensities and/or frequency. Once grain traces have been normalized, the invention allows reduction of the grain to a level chosen automatically or by a user of the invention, as desired. In addition the normalized grain trace data may be used to balance the digital image's color channels.

BRIEF DESCRIPTION OF THE DRAWINGS

For a more complete understanding of the present invention and the advantages thereof, reference is now made to the following descriptions taken in conjunction with the accompanying drawings in which:

FIG. 20 illustrates a flow chart describing an example of a process that may be used to enhance a digital image in accordance with the invention.

DETAILED DESCRIPTION OF THE DRAWINGS

The preferred embodiment of the present invention and its advantages are best understood by referring to FIGS. 1 through 15 of the drawings, like numerals being used for like and corresponding parts of the various drawings.

Figure 1:
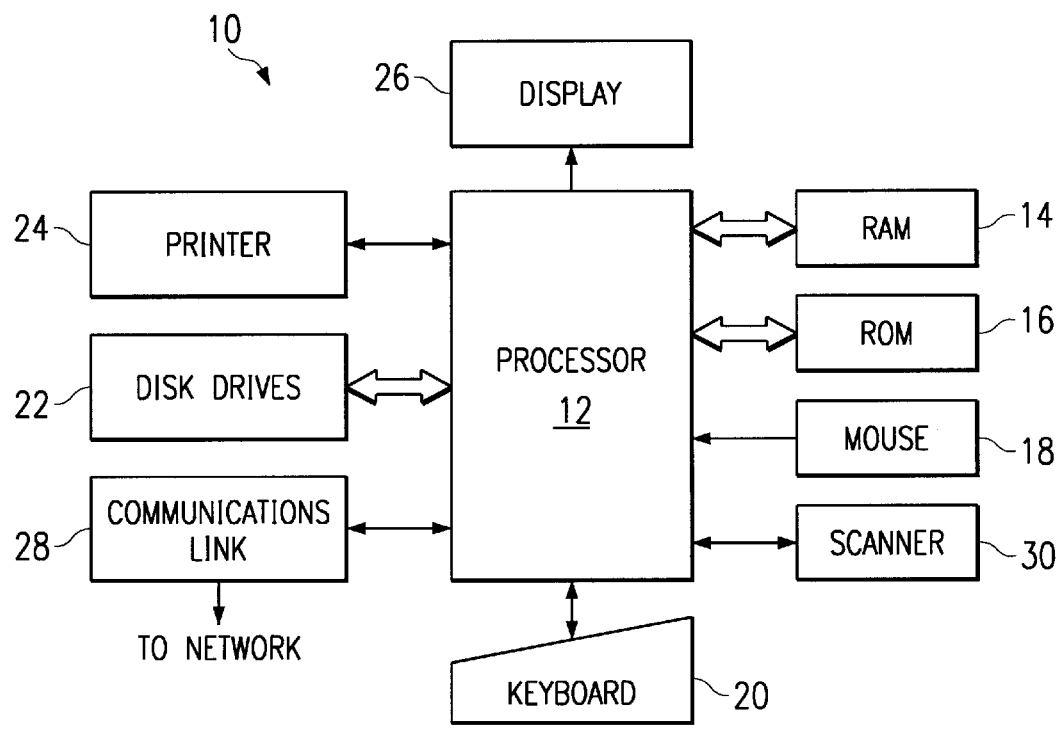
FIG. 1 illustrates a block diagram of a general purpose computer that may be used in accordance with the present invention.

FIG. 1 illustrates a general purpose computer 10 that may be used for image enhancement in accordance with the present invention. Specifically, general purpose computer 10 may comprise a portion of an image enhancement system and may be used to execute applications comprising image enhancement software. General purpose computer 10 may be adapted to execute any of the well known MS-DOS, PC-DOS, OS2, UNIX, MAC-OS and Windows operating systems or other operating systems. General purpose computer 10 comprises processor 12, random access memory (RAM) 14, read only memory (ROM) 16, mouse 18, keyboard 20, and input/output devices such as printer 24, disk drives 22, display 26, and communications link 28. The present invention includes programs that may be stored in RAM 14, ROM 16, or disk drives 22 and may be executed by processor 12. Communications link 28 is connected to a computer network but could be connected to a telephone line, an antenna, a gateway, or any other type of communication link. Disk drive 22 may include a variety of types of storage media such as, for example, floppy disk drives, hard disk drives, CD-ROM drives, or magnetic tape drives. Although this embodiment employs a plurality of disk drives 22, a single disk drive 22 could be used without departing from the scope of the invention. FIG. 1 only provides one example of a computer that may be used with the invention. The invention could be used on computers other than general purpose computers as well as general purpose computers without conventional operating systems.

General purpose computer 10 further comprises scanner 30 that may be used to scan images that are to be enhanced in accordance with the teachings of the invention. In this embodiment, enhancement may be performed by software stored and executed by scanner 30 with the results stored in a storage medium comprising a part of scanner 30 and/or in any of the storage devices of general purpose computer 10. Alternatively, software for image enhancement may be stored in any of the storage media associated with general purpose computer 10 and may be executed by processor 12 to enhance images scanned by scanner 30. In addition, image enhancement could occur both internally within scanner 30 and in general purpose computer 10 as described without departing from the scope of the invention. Scanner 30 may comprise a film scanner or a flatbed scanner of any type without departing from the scope of the invention.

Figure 2:
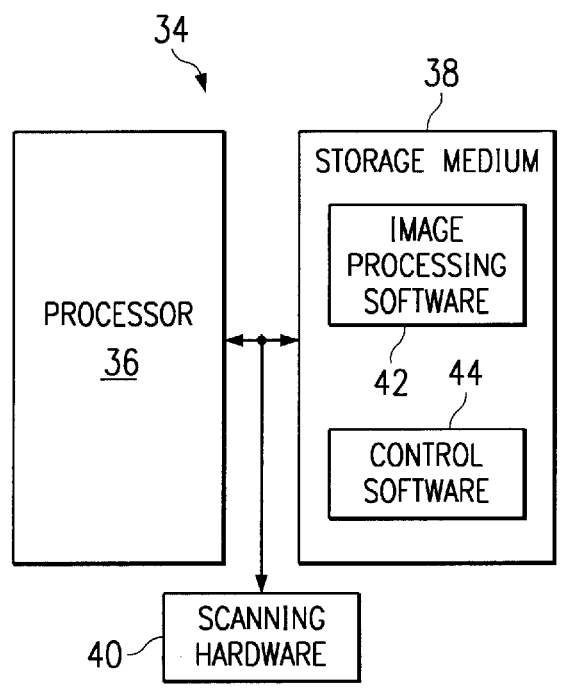
FIG. 2 illustrates an example of a scanner that comprises an embodiment of the present invention.

FIG. 2 illustrates an exemplary scanner 34 constructed in accordance with the invention. Scanner 34 comprises processor 36, storage medium 38 and scanning hardware 40. Processor 36 controls the operation of scanning hardware 40 by executing control software 44 stored in storage medium 38. Although a single storage medium has been illustrated for simplicity, storage medium 38 may comprise multiple storage mediums as well as comprising storage mediums of different types. Thus, for example, control software 44 may be stored in ROM memory, RAM memory, or on a disk drive. Scanning hardware 40 is used to convert an analog image into a digital image utilizing some type of optical circuitry. Any type of optical circuitry could be used for scanning hardware 40 without departing from the scope of the invention. After scanning hardware 40 has scanned an image, that image may be enhanced in accordance with the invention using image processing software 42, which is stored in storage medium 38. Similarly, the scanned image may be stored in storage medium 38 as may the enhanced image. Alternatively, scanner 34 may not have any image processing software 42. Such software instead may be provided on general purpose computer 10 for enhancement of an image received from scanner 34. Accordingly, a scanned image and/or an enhanced scanned image may be provided by scanner 34 to the general purpose computer 10 through a communications port (not explicitly shown). Although one embodiment of an exemplary scanner 34 that may be used for image enhancement in connection with the invention has been illustrated, other scanners may be used without departing from the scope of the invention.

Figure 3:
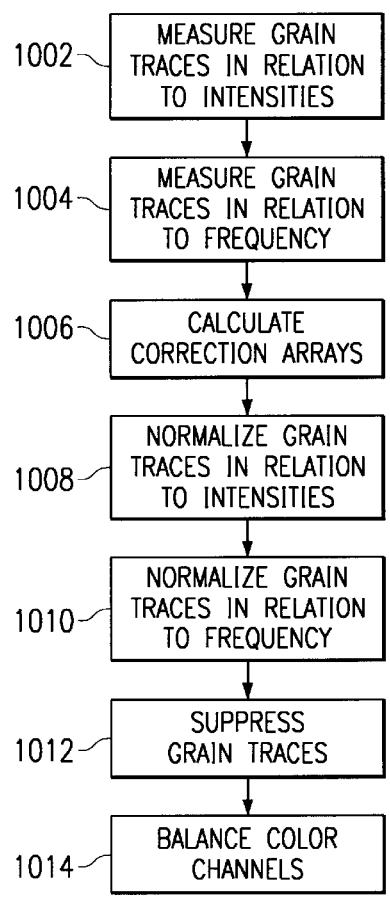
FIG. 3 illustrates a flow chart describing the enhancement of a digital image in accordance with one method of the present invention.

FIG. 3 illustrates a flowchart describing a method employed by one embodiment of the present invention to enhance a digital image. The steps described herein may be carried out using computer software, as can the steps of any of the processes described below. That software, as discussed above, may be executed by scanner 34 or general purpose computer 10. A digital image received from other than scanner 30 may be enhanced in accordance with the invention. In step 1002, a digital image's grain traces are measured in relation to pixel intensities. Grain traces are measured in relation to frequency in step 1004. In step 1006, correction arrays are calculated. The correction arrays are used to normalize the digital image's grain traces in relation to intensities, in step 1008, and then to normalize the grain traces in relation to frequency, in step 1010. The normalized grain trace data may be used to suppress grain traces in step 1012. In addition, the pixel intensity values obtained by normalizing grain traces can be used to balance these pixel intensities across the color channels, as noted in step 1014. Some of these steps could be omitted or other steps included without departing from the scope of the invention.

Although the invention may be used for digital images created from photographic images, it may also be used to normalize high frequency noise, such as grain traces in other types of images, such as satellite images, medical images, etc. The discussion below addresses normalization of both monochrome and color images. For color images, the process described below may be used or the process described for monochrome images may be used on each individual channel of the color image. Alternatively, the monochrome process may be used on a subset of channels with the color process used on remaining channels. Similar options apply to non-photographic digital images.

Measuring Grain Traces in Relation to Intensity

Figure 4:
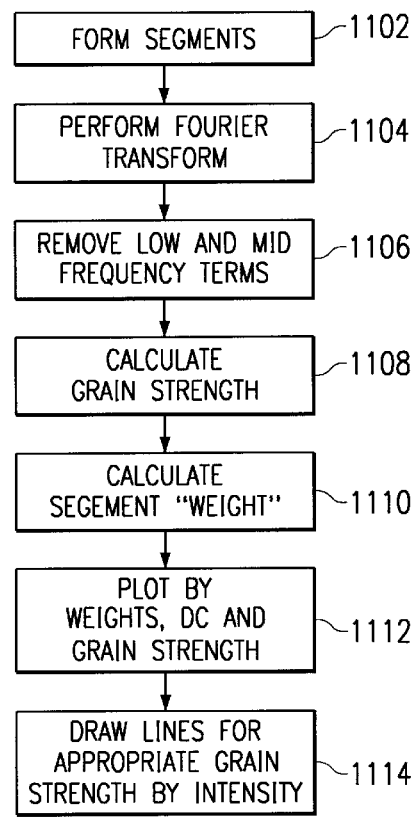
FIG. 4 illustrates a flow chart describing one method of measuring grain traces in relation to pixel intensities in accordance with the present invention.

The invention includes a method to measure grain traces in relation to pixel intensities. FIG. 4 shows the steps involved in this method. All calculations in this application related to this and other methods may be performed using general purpose computer 10, scanner 34, or a combination of one of these devices in cooperation with other devices. The digital image may be divided into segments in step 1102, followed by a transform, such as a Fourier transform, in step 1104, and the removal of the low and mid frequency terms in step 1106. Various formulae may then be used to calculate the grain strength (a value representing the deviation in magnitudes of pixel intensities resulting from grain traces) of each segment, in each color channel, in step 1108. To help verify these grain strengths, a separate formula may be used to calculate a "weight" value for each segment in each color channel, in step 1110. Next, scatter plots may be created dependent upon weight value, DC (direct current, conventionally meaning the average of a signal), and grain strength for each color channel, in step 1112. Lines may be drawn through the scatter plots using a curve-fitting algorithm to show the appropriate grain strength for each pixel intensity, in step 1114.

Segmenting

Figure 5:
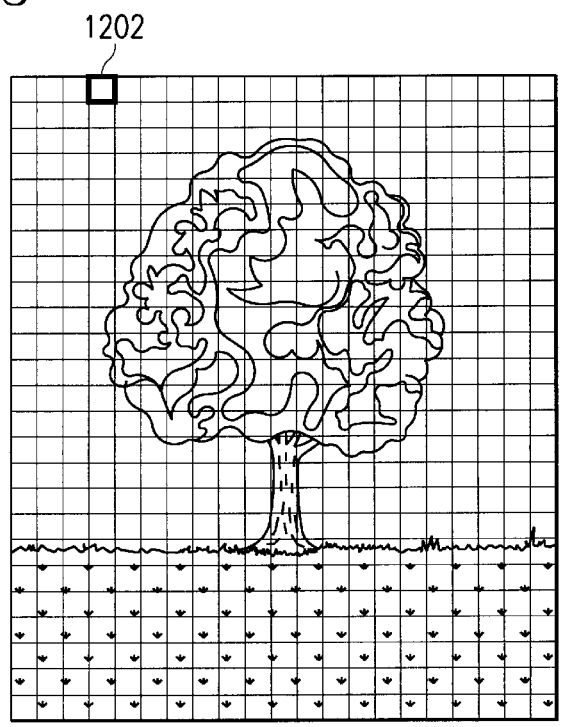
FIG. 5 illustrates an image divided into segments.

In step 1102, the digital image is divided into segments of data, each segment corresponding to a spatial area of the digital image. Segmentation may be applied to each channel of the digital image, or to the single channel in the case of a monochrome image. A representation of this division, presented in FIG. 5, shows multiple segments, such as segment 1202. Although any segment size could be used, the area of each segment advantageously may be large enough to contain a statistically significant number of pixels, such as between 16 and 1024 pixels, but not so large as to contain areas of the image that contain many substantially different intensities (in an image size of 2000 by 3000 pixels). Segments containing 256 (a 16×16 segment) different pixels may provide a good compromise between being large enough to provide enough data, but not being too large, and, therefore, having too many different intensity components within a single segment for an image on the order of 2000 pixels by 3000 pixels. Using this method, about 24K non-overlapping segments will typically be formed for a single 35 mm negative (or transparency). Any image size or any segment size may be used without departing from the scope of the invention.

FIG. 5 shows these segments as squares, but they can have other shapes without departing from the invention. Different segments also need not have the same shape or size, although for ease of processing it may be useful to make them uniform. In a specific embodiment, the number of segments as well as their shapes and sizes can be defined by changes in the image connected with frequency, intensity, or frequency content. Also note that segments can be overlapped and windowed as described in "Image Block Windowed Blending," U.S. patent application Ser. No. 09/247, 264, filed Feb. 10, 1999, which is incorporated by reference as if fully set forth herein.

Fourier Transform

Having segmented the digital image, a Fourier transform is performed on the pixel intensity values for each segment, in each color channel (or in the single monochrome channel), as shown in step 1104 of FIG. 4. The data that forms the digital image contains intensity values for each pixel in the image, arranged spatially for each color channel. Intensity refers to a pixel's brightness. For example, a white pixel has greater intensity values than a gray or black pixel. The same spatial area of different color channels typically have different pixel intensity values.

The Fourier transform converts the pixel intensity values for each segment from the spatial domain to the frequency domain. One of the values that a Fourier transform calculates is the average intensity, or "DC," of each segment, for each color channel. Another value that the Fourier transform calculates is the frequency and magnitude of vertical and horizontal frequency vectors for each frequency element within each segment, for each color channel. Although this embodiment uses a Fourier transform, other types of transforms could be used to transform a signal from the spatial domain to the frequency domain, such as a Hadamard transform; Furthermore, the frequency transform space may be subdivided using high-pass filters.

Removing Low & Mid Frequencies

Next, in step 1106 of FIG. 4, the low and mid frequency terms of each transform may be removed from further consideration. Alternatively, these terms could be damped, or this step omitted, without departing from the scope of the invention. In this embodiment each segment of each color channel (or of the single channel of a monochrome image) receives this removal within a range useful for a particular embodiment of the invention. Grain traces that have predominantly high frequency are easiest to measure and differentiate from image information. Because the physical grains in photographic film tend to be small and randomly placed, grain traces exist approximately equally in all frequencies before scanning, but there is generally less image content at higher frequencies. To give the best discrimination of grain traces over image detail, a focus on high frequencies is desirable.

In this embodiment, a 16×16 segment is used. Again, other segment sizes could be used without departing from the scope of the invention. To filter out low and mid range frequencies, one may, for example, filter out all frequencies where the sum of the absolute values of the x-frequency and y-frequency positions are less than or equal to 8. Alternatively, if the frequency vectors are arranged as on FIG. 18, a suitable radius around the DC value can be chosen, for example $$\sqrt{x^2+y^2}=8$$

Frequencies inside this radius may be removed. Another radius or method of filtering can be used without departing from the scope of the invention.

Calculating Grain Strength

Next, in step 1108 of FIG. 4, cross-correlation formulas may be used to calculate the grain strength of each segment. In the case of a monochrome digital image, cross-correlation formulas are not used as only one channel exists. For color images and monochrome images, the calculations use the frequency vectors of the digital image obtained from the Fourier transform, after the removal of the low and mid frequency terms.

To understand these calculations, an explanation of a digital image will be useful. The total information that comprises a segment is made up of the information for each pixel of each color channel. For example, in a typical three-color digital image the total information for a segment is a combination of the information from the red, green, and blue channels. The term "color channel" is used for convenience and the image channels do not necessarily have to be color channels. The invention may be applied to image channels of a digital image even if such channels are not representative of a color. In this embodiment, the channels represent the three color channels of a photographic image.

The red information, meaning here the red frequency vectors, can be represented by Formula 1. For purposes of this patent, a bold letter represents a complex vector, which by convention can be considered to have a real and imaginary component or alternately a magnitude and phase component.

$$R=R_s+R_n \qquad (1)$$

In Formula 1, R represents the combined signals of each pixel in a segment recorded through the red channel. $R_s$ is that part of the segment's red information that is from the image signal itself. $R_n$ is the part from the "noise," which can effectively considered to be grain traces.

Similarly, the green information and the blue information are:

$$G=G_s+G_n \qquad (2)$$

$$B=B_s+B_n \qquad (3)$$

Given that only R, G, and B can be measured, estimates are calculated for $R_n$, $G_n$, and $B_n$. Similarly, an estimate is calculated for the noise component of a monochrome image channel.

Because the grain patterns are different in each color layer of the original film, one can reasonably assume that the grain traces, effectively the noise, in a segment of a digital image are uncorrelated across the color channels. In other words, the intensity values from the noise portion of the signal in a segment will tend to be different in each color channel. On the other hand, the intensity values from the image portion of the signal in a segment tend to be similar in each color channel, and thus are correlated. Such correlation may logically result from the principle that the luminance component of natural images is often stronger than the color components.

Thus the cross-correlations between colors may be used as a predictor of the ratio mix of $R_s$ and $R_n$, comprising R. A very weak cross-correlation implies that the signal is very close to zero, and thus $$R_n \approx R=R_s+R_n \qquad (4)$$

On the other hand, a strong cross-correlation implies that the Rs component predominates over Rn, so that $$R_n << R=R_s+R_n \qquad (5)$$

Thus, a reasonable estimate of the noise can be made:

$$\text{estimated } R=F(\text{cross-correlation}) \cdot R \qquad (6)$$

In Formula 6, F(cross-correlation) approaches 0 as cross-correlation approaches auto-correlation, i.e. perfect cross-correlation, and approaches 1 as cross-correlation approaches 0.

Thus, the cross-correlation among image channels may be used to derive an improved estimate of $R_n$, given R. However, in the presence of a strong signal, that estimate may become less reliable. Hence, a second use of the cross-correlation is to derive an estimate of this reliability, and subsequently a "weight" governing how much to count the estimate of $R_n$ in averages with other segments.

The measurement of cross correlations between the information from two color channels, such as the red and green channels, can thus be expressed algebraically:

$$RG = (R_s + R_n)(G_s + G_n) = R_s G_s + R_n^0 G_s + G_s^0 R_n + R_n^0 G_n \cong R_s G_s \qquad (7)$$

In Formula 7, RG indicates the cross correlation of the information about a segment from the red and green channels. It is accomplished by complex multiplication of the segment's frequency values from the red channel by those from the green channel, frequency by frequency for each non-DC frequency term remaining after the low and mid range frequencies have been removed. For example, the frequency vector for frequency location 1 in the red channel is multiplied by the frequency vector for frequency location 1 in the green channel. In a separate calculation, the frequency vector for frequency location 2 in the red channel is multiplied by the frequency vector for frequency location 2 in the green channel, and so on. Note that these are vector multiplications or "dot products" of two vectors and therefore represent the correlation, including vector direction, of the two vectors. The products of these individual calculations are summed.

Formula 7 also shows that, over large areas of the digital image, the values $R_n G_s$, $G_s R_n$, and $R_n G_n$ do not correlate. Their products are sometimes randomly positive and sometimes randomly negative, and so have a small impact on the final sum. Their average tends toward zero. Finally, Formula 7 shows that, frequency by frequency, the total, correlated red and green information for a segment roughly equals the correlated red and green image-signal values. In the same way, $BR = B_s R_s$ and $BG = B_s G_s$.

The cross-correlations among the color channels for each segment, frequency location by frequency location, may be calculated using Formulas 8–10.

$$BR = RB = \Sigma R \cdot B \text{ for entire segment} \quad (8)$$

$$RG = GR = \Sigma G \cdot R \text{ for entire segment} \quad (9)$$

$$BG = GB = \Sigma G \cdot B \text{ for entire segment} \quad (10)$$

Thus, the cross correlation for a particular segment between two color channels comprises a sum of the dot products of the frequency domain vectors (after removal of low and mid range frequency terms) at corresponding frequencies.

Next, the grain strength may be measured for each segment in each color channel. Grain strength is the number of traces left from the grains in the original film. Segments with a large number of grain traces have a high grain strength. The red grain strength (Rgs) for a segment can be calculated as follows:

$$Rgs = \Sigma |R_n| = \Sigma \sqrt{R_n \cdot R_n} \quad (11)$$

That is, the red grain strength in a segment equals the sum of the absolute value of its red noise values, which in turn is equal to the sum of the square root of the red noise values squared.

The following estimate, based on empirical research may be used:

$$\sqrt{R_n \cdot R_n} \cong \sqrt{R \cdot R_n} \quad (12)$$

Note that the square root is used to minimize the impact of occasional strong noise. This estimate may be used for the other color channels as well, or for the single channel of a monochrome image.

Since $R_n = R - R_s$, the formula for the red channel's grain strength can be given as follows:

$$Rgs \cong \Sigma \sqrt{R \cdot R_n} \cong \Sigma \sqrt{R \cdot (R - R_s)} \quad (13)$$

Note that for a given segment of R, as $R_s$ increases and Rn decreases, the value for "$R - R_s$" approaches zero, and therefore $R_{gs}$ approaches zero. Conversely, as $R_n$ increases and $R_s$ decreases, the value for "$R - R_s$" increases, and therefore $R_{gs}$ increases.

The formulas for the grain strengths of the green and blue channels can be given in the same way:

$$Ggs \cong \Sigma \sqrt{G \cdot G_n} \cong \Sigma \sqrt{G \cdot (G - G_s)} \quad (14)$$

$$Bgs \cong \Sigma \sqrt{B \cdot B_n} \cong \Sigma \sqrt{B \cdot (B - B_s)} \quad (15)$$

An analogous formula may be used for the single channel of a monochrome image.

Some of the image signal from each color channel exists in the image signals from the other color channels. For example, some of the red image signal ($R_s$) exists in both the green image signal ($G_s$) and the blue image signal ($B_s$) Some of the green image signal ($G_s$) exists in both the red ($R_s$) and the blue ($B_s$) image signals, and some of the blue image signal ($B_s$) exists in both the red ($R_s$) and the green ($G_s$) image signals.

The following constant (K) values, are useful for identifying grain strength as described below:

$K_{RG}$ is the amount of the red image signal in the green image signal.

$K_{GR}$ is the amount of the green image signal in the red image signal.

$K_{RB}$ is the amount of the red image signal in the blue image signal.

$K_{GB}$ is the amount of the green image signal in the blue image signal.

$K_{BR}$ is the amount of the blue image signal in the red image signal.

$K_{BG}$ is the amount of the blue image signal in the green image signal.

Based on empirical research, estimates for the value of each color's image signal, based on these constant values and on the frequency magnitudes of input signal and noise information may be made. In one implementation, the estimates for the red, green, and blue signals are $$Rs \cong \tfrac{1}{2} K_{RG} G + \tfrac{1}{2} K_{RB} B \quad (16)$$

$$Gs \cong \tfrac{1}{2} K_{GB} B + \tfrac{1}{2} K_{GR} R \quad (17)$$

$$Bs \cong \tfrac{1}{2} K_{BR} R + \tfrac{1}{2} K_{BG} G \quad (18)$$

In Formulas 16–18, R is the set of red frequency vectors for a segment, G is the set of green frequency vectors, and B is the set of blue frequency vectors. These values have already been obtained from the Fourier transform. As before, the low and mid frequencies have been removed.

To solve for the red grain strength (Rgs) then, the formula is $$R_{gs} \cong \Sigma \sqrt{R \cdot (R - R_s)} \cong \Sigma \sqrt{R \cdot [R - (\tfrac{1}{2} K_{RG} G + \tfrac{1}{2} K_{RB} B)]} \quad (19)$$

To solve for the green and blue grain strengths, the formulas are $$G_{gs} \cong \Sigma \sqrt{G \cdot [G - (\tfrac{1}{2} K_{GB} B + \tfrac{1}{2} K_{GR} R)]} \quad (20)$$

$$B_{gs} \cong \Sigma \sqrt{B \cdot [B - (\tfrac{1}{2} K_{BR} R + \tfrac{1}{2} K_{BG} G)]} \quad (21)$$

Another set of estimates may be used to solve for the constant (K) values by using the previously calculated cross-correlations (see Formulas 8–10). For example, $K_{RG}$ may be estimated as follows:

$$K_{RG} = \frac{R_s}{G_s} = \frac{\sqrt{\frac{RG \cdot RB}{BG}}}{\sqrt{\frac{GB \cdot GR}{BR}}} = \sqrt{\frac{RG \cdot RB \cdot BR}{BG \cdot GB \cdot GR}} = \frac{BR}{BG} \quad (22)$$

Solving in the same way, the other K values are $$K_{GR} = \frac{GB}{BR} \quad (23)$$

-continued $$K_{RB} = \frac{GR}{BG} \quad (24)$$

$$K_{BR} = \frac{BG}{GR} \quad (25)$$

$$K_{GB} = \frac{GR}{BR} \quad (26)$$

$$K_{BG} = \frac{BR}{GR} \quad (27)$$

Using the values. that have been obtained, the grain strength in each segment can now be calculated for each color, using the frequency vectors obtained from the Fourier transforms, with the low and mid frequencies removed (R, G, and B in these formulas).

For example, the present invention estimates the red grain strength through the following series of equations and estimates:

$$R_{gs} = \Sigma|R_n| = \Sigma\sqrt{R_n \cdot R_n} \quad (11)$$

$$\sqrt{R_n \cdot R_n} \cong \sqrt{R \cdot R_n} \quad (12)$$

$$R_{gs} \cong \Sigma\sqrt{R \cdot R_n} \quad (13)$$

$$R_n = R - R_s \quad (13)$$

$$R_{gs} \cong \Sigma\sqrt{R \cdot (R - R_s)} \quad (13)$$

$$R_s \cong \tfrac{1}{2}K_{RG}G + \tfrac{1}{2}K_{RB}B \quad (16)$$

$$R_{gs} \cong \Sigma\sqrt{R \cdot [R - (\tfrac{1}{2}K_{RG}G + \tfrac{1}{2}K_{RB}B)]} \quad (19)$$

$$K_{RG} = BR/BG \quad (22)$$

$$K_{RB} = GR/BR \quad (23)$$

$$R_{gs} \cong \Sigma \sqrt{R \cdot \left[R - \left(1/2\frac{BR}{BG}G + 1/2\frac{GR}{BR}B\right)\right]} \quad (28)$$

$$BR = \Sigma R \cdot B \quad (8)$$

$$BG = \Sigma G \cdot B \quad (10)$$

$$GR = \Sigma G \cdot R \quad (9)$$

$$R_{gs} \cong \Sigma \sqrt{R \cdot \left[R - \left(1/2\frac{\Sigma R \cdot B}{\Sigma G \cdot B}G + 1/2\frac{\Sigma G \cdot R}{\Sigma R \cdot B}B\right)\right]} \quad (29)$$

The formulas for estimating the green grain strength and the blue grain strength are $$G_{gs} \cong \Sigma \sqrt{G \cdot \left[G - \left(1/2\frac{\Sigma G \cdot R}{\Sigma R \cdot B}B + 1/2\frac{\Sigma G \cdot B}{\Sigma R \cdot B}R\right)\right]} \quad (30)$$

$$B_{gs} \cong \Sigma \sqrt{B \cdot \left[B - \left(1/2\frac{\Sigma G \cdot B}{\Sigma G \cdot R}R + 1/2\frac{\Sigma R \cdot B}{\Sigma G \cdot R}G\right)\right]} \quad (31)$$

In each case, the summation is over each frequency in the spatial frequency domain.

For monochrome images, the grain strength for each segment is estimated by summing the square root of the dot product of each frequency vector with itself after removal of low and mid-frequencies.

Calculating Segment Weights

Having estimated the grain strength according to one set of calculations, a second set of formulas may be used to determine a "weight" value for each segment, for each color channel, as shown in step 1110 of FIG. 4. Again, the frequency vectors obtained from the Fourier transforms with the low and mid frequencies removed may be used. The weight value provides a confidence level that the calculated grain strength (noise) is actually a measurement of grain traces and not of image detail.

To calculate the weight value, Formulas 8–10 may be used. In addition, the following formulas for the total of the frequency vector values for each segment may be used. These formulas (which are a measure of auto correlation) sum the dot products of the frequency vectors with themselves for all the frequency locations within a segment. Separate sums are found for each color channel.

$$RR = \Sigma R \cdot R \quad (32)$$

$$GG = \Sigma G \cdot G \quad (33)$$

$$BB = \Sigma B \cdot B \quad (34)$$

In each case, R, G, and B represent the Fourier transform of a segment with low and mid range frequencies removed.

Using the results obtained from Formulas 8–10 and 32–34, a weight value for each segment may be calculated according to the following formula:

$$weight = 1.0 - \left(\sqrt{\frac{RG + RB + GB}{RR + GG + BB}}\right) \quad (35)$$

Formula 35 is useful because the same frequency values of different colors from the image portion of a segment are more similar among the color channels than are those from grain traces. The grain traces recorded from each color channel have separate patterns in a digital image, as explained earlier in this application, and so have different sets of frequency values. On the other hand, the image tends to be similar across the color channels, and consequently has similar frequency values in each color channel.

For example, in a segment composed entirely of image signals, the combined value of the cross-correlations in the numerator of the weight value equation will roughly equal the combined value of the auto-correlations in the denominator. The weight value of that segment will thus tend toward 1.0–the square root of 1, or finally 0.

However, a segment composed entirely of grain trace signals will have a weight value that tends toward 1.0–0, or finally 1.0. This is because the combined value of the cross-correlations in the numerator will be much smaller than the combined value of the auto-correlations in the denominator.

Consequently, the more the content of a segment is composed of image signals, the more the weight value will approach 0. The more the content of a segment is composed of grain traces (noise), the more the weight value will approach 1.

For monochrome images, the weight is generally set to a fixed value such as one.

Plotting by Weight, DC, and Grain Strength

Having performed these calculations, the weight values for each segment may be plotted in three graphs for the whole image, one for each color channel, as shown in step 1112 of FIG. 4. To clarify, one graph may be plotted for each color channel for the image, not one graph per segment.

Each segment in the digital image is represented on the plot according to its grain strength and DC, (which is the average intensity value for the segment obtained through the Fourier transform). In addition, the plotted point for each segment is assigned that segment's weight value. The result is a scatter plot where the x-axis represents average intensity, the y-axis represents grain strength and the magnitude of a particular point on the scatter plot comprises the weight value. For a monochrome image, a single scatter plot may be generated, consistent with the modified formulas for grain strength and weight described above.

Figure 6:
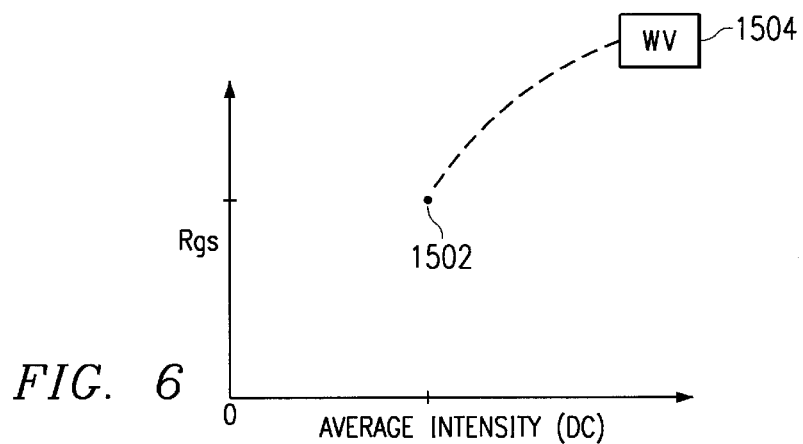
FIG. 6 illustrates the plotting by weight, average intensity, and grain strength for the red channel information for one segment of a digital image.

FIG. 6 illustrates the plotting for the red channel information about one segment in a digital image. The y-axis represents grain strength. The x-axis represents average intensity. Point 1502 is the point for the segment's red grain strength and red average intensity. The expanded view 1504 of point 1502 illustrates the weight value (WV) for that segment.

Figure 7:
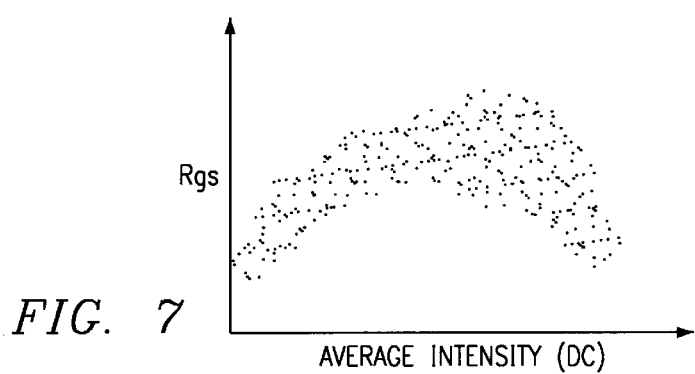
FIG. 7 illustrates a scatter plot for one color channel of a digital image.

In the same way, a point for the segment is plotted separately for the green channel on a green scatter plot and for the blue channel on a blue scatter plot. After plotting the data for an image's segments, the result is three scatter plots, one for each color channel. FIG. 7 illustrates a scatter plot for a digital image's segments recorded through one color channel, for example the red channel. Similar scatter plots would show the results for the green and blue channels, or for the single channel of a monochrome image.

Drawing Lines for Estimated Grain Strength

Figure 8:
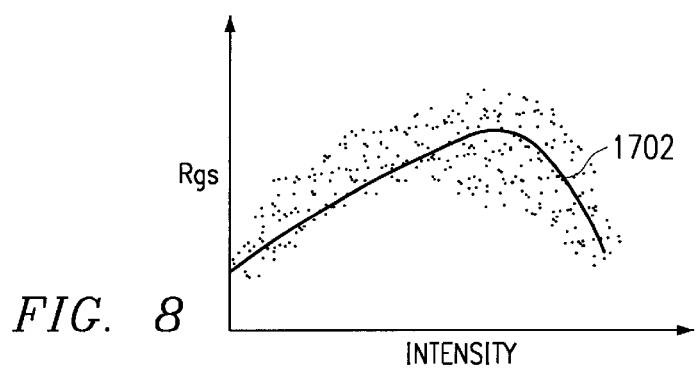
FIG. 8 illustrates a line drawn through a scatter plot for one color channel of the digital image using a curve fitting algorithm.

Once the scatter plots have been created, curve-fitting techniques may be used to draw lines through the haze of points, for each color channel (or for the single channel of a monochrome image), as noted in step 1114 of FIG. 4. Weight values assigned to each point position may influence the exact position of these lines, with larger weight values pulling the lines in their direction. FIG. 8 illustrates the line 1702 drawn through a scatter plot for one color channel, for example the red channel. The curve represents grain strength plotted versus density. Although curve fitting will be discussed below, any curve fitting technique could be used without departing from the scope of the invention. In addition, varying techniques could be used for different color channels.

These lines can be used subsequently to determine a useful measurement of the estimated grain strength of any pixel in the digital image for a particular color channel in response to that pixel's intensity value in the particular color channel. This measurement can be used in various ways to make the digital image more visually pleasing.

The assumption that image information exists in all three channels holds most of the time. But brightly colored areas of a digital image may contain areas with strong image but small correlations between colors, resulting therefore in occasional strong points that lie well outside of the average range. To achieve a desirable fit for estimated grain strength, the curve-fitting technique may take into account the occasional strong points and not let the curve be distorted by them. For example, it can use a median average of the points, or it can find a prototype of the best fit. It could also do a first prototype of the best fit, suppress the strong points that lie above twice the prototype line, and then do a second best fit on the modified data. For such strong points, there is a high probability that they represent image detail rather than noise so suppressing these points may produce a more accurate curve. Such a best fit operation could be performed multiple times until no points are discarded. In this embodiment, a median average technique is used.

Figure 9:
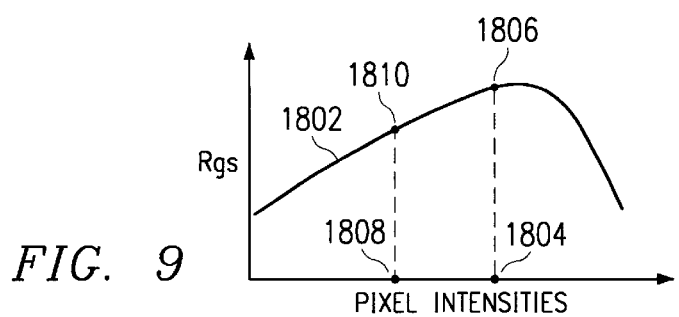
FIG. 9 illustrates a line drawn through a scatter plot for the red information of a digital image.

FIG. 9 shows the line 1802 drawn for the red information of a digital image. This line 1802 may be the same curve or proportional to the curve generated in connection with the scatter plots, such as line 1702 of FIG. 8. Note that here the x-axis represents pixel intensity value, not the average pixel intensity over an entire segment used previously. For a pixel with the intensity shown at point 1804, the estimated grain strength is at point 1806. In other words, although curve 1702 was derived from a scatter plot based upon average intensity, curve 1802 (which may be the same as curve 1702) can be used to provide an estimate of a pixel's grain strength, given its intensity.

Measuring Grain Strength in Relation to Frequency

After completing the measurements of grain traces, grain strength may be measured in relation to frequency, for each color channel (or for the single channel of a monochrome image), as shown in step 1004 of FIG. 3. Frequency content refers to image detail. Segments with a higher degree of image detail have more content at all frequencies.

For example, consider an image of a tree surrounded by sky and rising from an expanse of grass. The grass portion of the image, with its many blades and shades of color, has mostly high energy in all frequencies, i.e. a large frequency content. Much of the high energy may be high frequency content. On the other hand, the sky portion, which lacks image detail has very little high frequency content arising from the image. Thus, any measured high frequency content can thus be assumed to arise primarily from grain detail.

Figure 10:
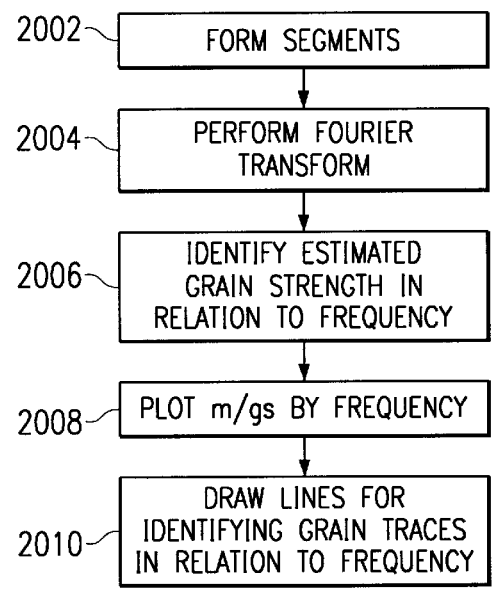
FIG. 10 illustrates a flow chart describing one method employed to measure grain traces in relation to frequency in accordance with the invention.

To measure grain strength in relation to frequency, the steps illustrated in FIG. 10 are carried out. In step 2002, the digital image is segmented a second time and a second Fourier transform is performed in step 2004, although alternately the results of the first segmenting and the first Fourier transform could be used. If new calculations are made, different segment size, shape, and overlap options could be used (such options are described above) as could different types of transforms (again, such options are described above). In step 2006, scatter plots with fitted curves are created to identify the estimated grain strength in relation to frequency. Next, in step 2008 the magnitude divided by the estimated grain strength is plotted based upon the grain strength vs. intensity function just derived, in relation to frequency values for each segment. In step 2010, lines for identifying grain traces in relation to frequency are drawn.

Segmenting

When measuring grain strength in relation to frequency, the digital image may be divided into segments in step 2002, using any of the techniques and options discussed above for step 1102 of FIG. 4.

Fourier Transform

In step 2004, a second transform is performed on the pixel intensity values for each segment, in each color channel (or in the single channel of a monochrome image), using any of the techniques and options discussed above in connection with step 1104 of FIG. 4. However, the range of low and mid frequency terms are not removed from the results, as shown previously in step 1106 in FIG. 4.

Identifying Estimated Grain Strength in Relation to Frequency

Using the DC (average intensity) values obtained in the second Fourier transform, the estimated grain strength in relation to frequency may be identified for each segment, in each color channel (or in the single channel of a monochrome image), as indicated in step 2006. The lines drawn (such as lines 1702 and 1802) previously through the scatter plots for each color channel (or for the single channel of a monochrome image) may be employed for this purpose. For each segment, the DC (average intensity) value from the second Fourier transform may be used to locate a point on the x-axis for intensity values of the curve, and thus to find, the estimated grain strength on the y-axis.

For example, if a segment has a DC value equivalent to the value at point 1808 in FIG. 9, its estimated grain strength would be the value at point 1810 on line 1802. Thus, each frequency in a segment is deemed to have an estimated grain strength derived from the average intensity of the segment.

Plotting M/GS by Frequency

After identifying the estimated grain strengths in relation to frequency, the magnitudes at each frequency, for each segment, in each color channel (or in the single channel of a monochrome image), may be divided by the estimated grain strength of each segment, in each color channel (or in the single channel of a monochrome image), in step 2008 of FIG. 10. The magnitudes at each frequency are those determined by the Fourier transform in step 2004.

New scatter plots may then be created, one plot for each color channel (or one for a monochrome image). The y-axis of the scatter plots represent, for the channel in question, the values of the magnitudes at each frequency of each segment, divided by the estimated grain strength for that segment. The x-axis of the scatter plots represent, for the channel in question, the frequency values which are present in the digital image. Thus, a point will be plotted on the scatter plot for each frequency of each segment in the image. In the example above, 289 frequencies were present so the new scatter plot for that example would have 289S plotted points where S represents the number of segments. There are no weight values attached to points in this scatter plot, except for the number of points plotted in the same location. To clarify, each point has weight one, but if a second point is to be plotted in the same location, the existing point may be assigned a weight of two. Alternatively, a list of points can simply be maintained containing both points.

Figure 11:
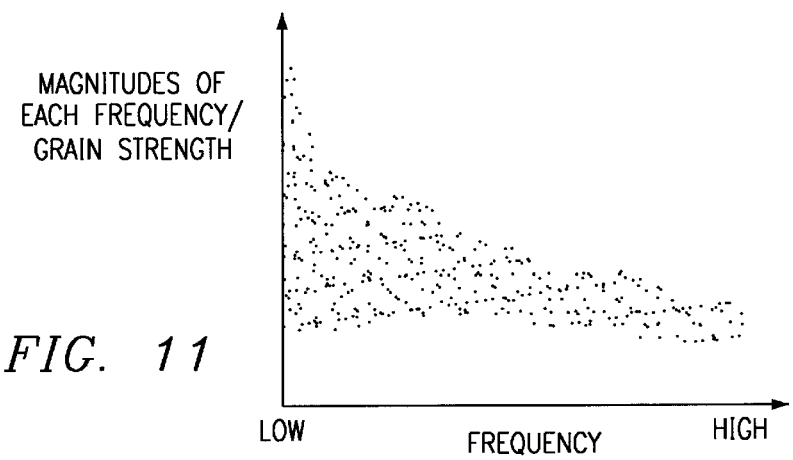
FIG. 11 illustrates a scatter plot for one color channel of a digital image.

FIG. 11 illustrates such a scatter plot for one color channel. The lower "haze" of points represents those segments that have been segregated by the above weighting to have a high probability of representing primarily grain strength and not image signal. Those points removed from the haze have a high probability of representing image signal.

Drawing Lines for Identifying Grain Traces in Relation to Frequency

Next, a line may be drawn through all the points in the lower haze in each scatter plot, using any curve-fitting algorithm, as shown in step 2010 in FIG. 10. In this embodiment, a median average type of algorithm is used. When drawing this line, the spurious higher plot points outside the haze may be ignored, so as not to distort the results. To do this, the following "weight" formula for each point may be used, where y is a point's value on the y-axis:

$$w = \frac{1}{y^3 + 0.5} \quad (36)$$

Figure 12:
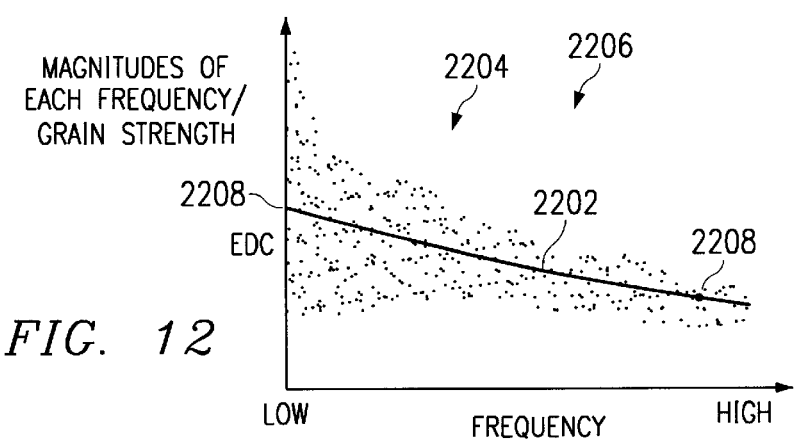
FIG. 12 illustrates a line drawn through a scatter plot for one color channel of a digital image.

Any other suitable weighting could be used without departing from the scope of the invention. FIG. 12 shows a line 2202 drawn through the haze for one color channel as an example. Note that spurious high points 2204 and 2206 are ignored when drawing the line. Also, it may be advantageous to only use the mid and high frequency plot points to determine the line. That way, strong low frequency content will not adversely effect the estimated DC.

Calculating Correction Arrays

A correction array may then be calculated for each color channel, as shown in step 1006 of FIG. 3.

Finding the DC Terms Estimated by the Plots

To calculate the correction arrays, the lines drawn through the scatter plots in step 2010 (FIG. 10) are used to calculate an estimated DC (EDC) value in each color channel (or in the single. channel of a monochrome image). For example, FIG. 12 shows that the EDC value indicated by point 2208 on line 2202. In this example, then, the three scatter plots provide an estimated DC value for the red, green, and blue channels.

Calculating Arrays

After determining the EDC values, an array is calculated for each color channel (or for the single channel of a monochrome image), using Formula 37, where [x] covers the range of pixel intensity values:

$$\text{array}[x] = \frac{1}{(EDC \cdot \text{grain strength}[x])} \quad (37)$$

One array is calculated per channel, using the estimated DC values obtained from the curves calculated in step 2010 and the estimated grain strength for each intensity obtained from the curves calculated in step 1114.

Calculating Correction Arrays

The array [x] values may be used to calculate a correction array, for each channel (or the single monochrome channel). Formula 38 may be used to calculate this array.

$$\text{correction}[x] = \sum_{n=1}^{x} \frac{(\text{array}[n-1] + \text{array}[n])}{2} \quad (38)$$

Normalizing Grain Traces in Relation to Intensity

After calculating the correction arrays, the digital image's grain traces can then be normalized in relation to intensities, as shown in step 1008 of FIG. 3. The values obtained through the correction arrays may be applied to the digital image's data to achieve normalization. Every pixel intensity value "x" in the digital image may be replaced by the value in the correction [x], for each color channel (or for the single channel of a monochrome image). This process causes the grain traces in the digital image to have approximately the same visual impact across the grayscale of each channel, which makes the digital image more visually pleasing. For example, it will be more pleasing when displayed as a positive on a typical monitor with a gamma of about 2.

Figure 13:
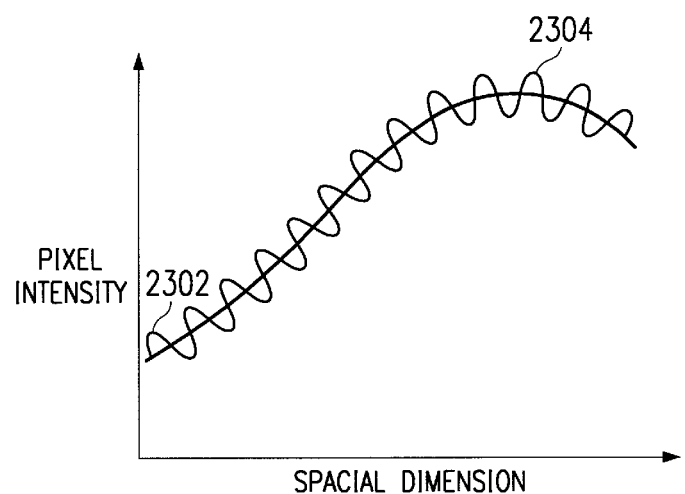
FIG. 13 illustrates the grain traces in one line of pixels from a normalized digital image, with the changes in pixel intensity plotted spatially.

FIG. 13 is a graphic representation of the grain traces in one line of pixels from a normalized digital image, with the changes in pixel intensity plotted spatially. Note that the range of pixel intensities is uniform throughout, and does not fluctuate considerably the way the pixel intensities do in an un-normalized digital image. The fluctuation at point 2302 in FIG. 23 is about the same as the one at point 2304.

Normalizing Grain Traces in Relation to Frequency

The digital image's grain traces may now be normalized in relation to frequency, as shown in step 1010 of FIG. 3. After the correction arrays have been applied, another frequency transform may be performed in order to transform each channel (or of the single channel) of the intensity normalized image from the time domain to the frequency domain. Alternatively, the correction arrays could be translated into a frequency domain function for application to the original spatial frequency domain representation of the image. In this embodiment, the correction arrays are applied in the time domain and transforms are performed on each channel to carry out the frequency normalization process about to be described.

Figure 14:
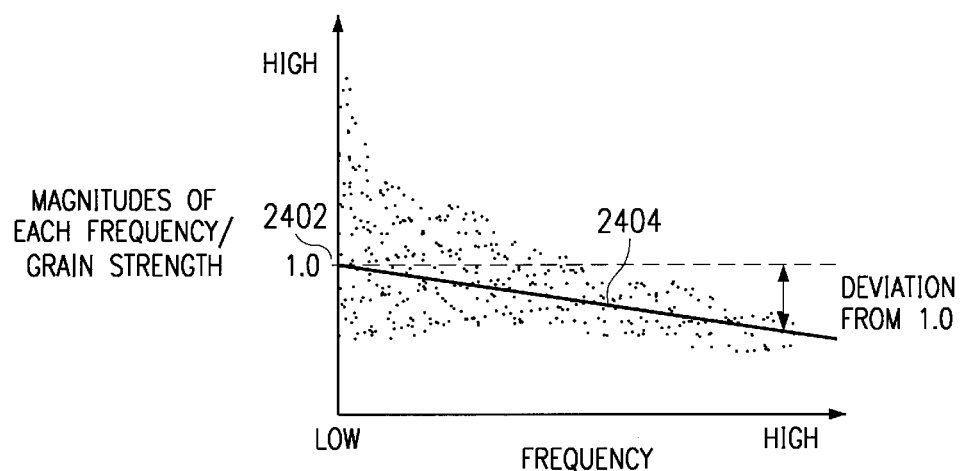
FIG. 14 illustrates the frequency magnitudes of grain traces plotted against the frequencies in a digital image normalized across intensities.

FIG. 14 is a 2D plot that graphically represents magnitudes plotted against the frequencies in a digital image after the software has normalized grain traces across intensities. Note that the average (DC) value 2402 is 1.0.

To normalize grain traces across frequencies, the software multiples each magnitude (M) of each frequency, in each segment, by a factor (F). The factor indicates how much the line 2404 drawn through the scatter plot deviates from 1.0.

$$\text{deviation factor}(F) = \frac{1.0}{M_{line}(F)} \quad (39)$$

An actual plot of the deviation factors would show a frequency boost curve, which is the inverse of line 2404 in FIG. 14. Note that the phase is unaffected and preserved.

Figure 15:
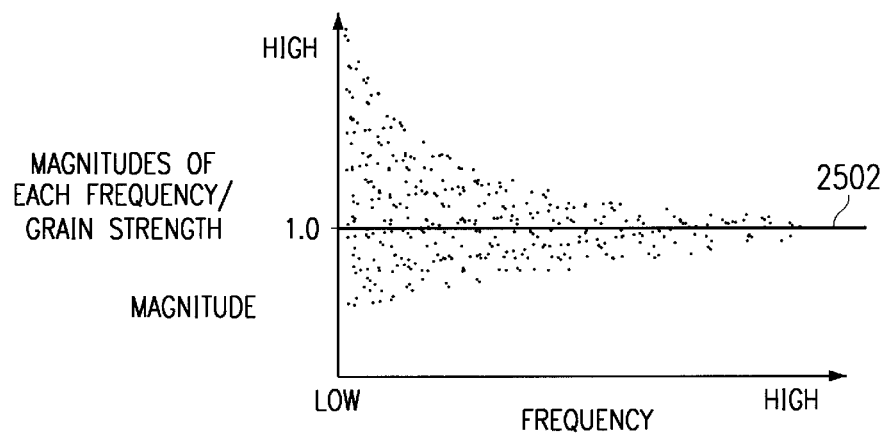
FIG. 15 illustrates the frequency magnitudes of grain traces plotted against the frequencies in a digital image normalized across intensities and frequencies.

FIG. 15 is a 2D plot that graphically represents the frequency magnitudes plotted against the frequencies in a digital image after the software has carried out the multiplication by the deviation factor. A line 2502 drawn through this plot by conventional methods shows that the magnitudes of the grain traces are roughly the same for areas of high and low frequency. They do not fluctuate widely, as they do in an un-normalized digital image.

Suppressing Grain Traces

After calculating the correction arrays, the normalized values obtained through the correction arrays may be used to suppress the grain traces in the digital image, as shown in step 1012 of FIG. 3. Other methods of grain suppression may be used without departing from the teachings of the invention, such as a second method described below.

In digital image normalization according to the above teachings, the grain strength in each segment, in each color channel, and in each frequency band has been adjusted so that the magnitude component is 1.0, as shown in FIG. 15. The phase is unaffected. Therefore, the magnitude of a component is a strong indicator that segregates grain traces (noise) from image detail wherein 1.0 is a watershed quantity. A magnitude above 1.0 has a high likelihood of arising from image detail, and a magnitude below 1.0 has a high likelihood of arising from grain traces. Therefore, to suppress grain traces in a digital image it is desirable to suppress components with magnitudes approaching and below 1.0. On the other hand, components with magnitudes above 1.0 can be taken to represent image detail and should not be suppressed.

This is in contrast to un-normalized digital image in which the watershed quantity between grain traces (noise) and image varies with intensity and frequency, making precise segregation of grain traces and image nearly impossible. As stated earlier, the image can be normalized, or data describing the distribution of noise with intensity and frequency could be included with an un-normalized image to guide grain reduction without departing from the scope of this invention.

To suppress grain traces, the following method may be applied to the magnitudes (M) of each frequency in the normalized digital image segment:

For each segment in the normalized digital image
Retain original phase information
For each M in the segment (excluding the DC term)
If (M<=0.5)
M=0
else
Suppression Factor=1.0−e$^{-(M-0.5)}$
M=M*Suppression Factor This formula suppresses frequencies with normalized magnitudes at or below 0.5, by substituting 0 for their values. Because some grain traces will have normalized magnitudes slightly above 0.5, the formula may also use a suppression factor to substitute lower magnitudes for those values. The suppression factor reduces frequency values with a higher normalized magnitude less, since these values tend to correspond to image details.

The example above has a digital image normalized by dividing each element by the known grain strength as a function of frequency and intensity and then applying a reduction with a watershed fixed at 1.0. An equivalent method would be to apply grain reduction with a watershed point equal to the expected noise as a function of frequency and intensity directly to the un-normalized component. To do this, one would use the grain suppression method listed above, but substitute M with M' in the suppression factor, where $$M' = \frac{M}{\text{expected grain traces}}$$

Other ways of suppressing grain traces are possible, advantageously using the normalized values from the correction arrays. For example, image enhancement software such as PHOTOSHOP™ can be used manually with the normalized values, though such software requires extensive user feedback to find the proper levels of suppression for grain traces.

Another method of suppressing grain traces that may suppress some or substantially all of the grain of an image, automatically or at the user's option, is now described.

Figure 16:
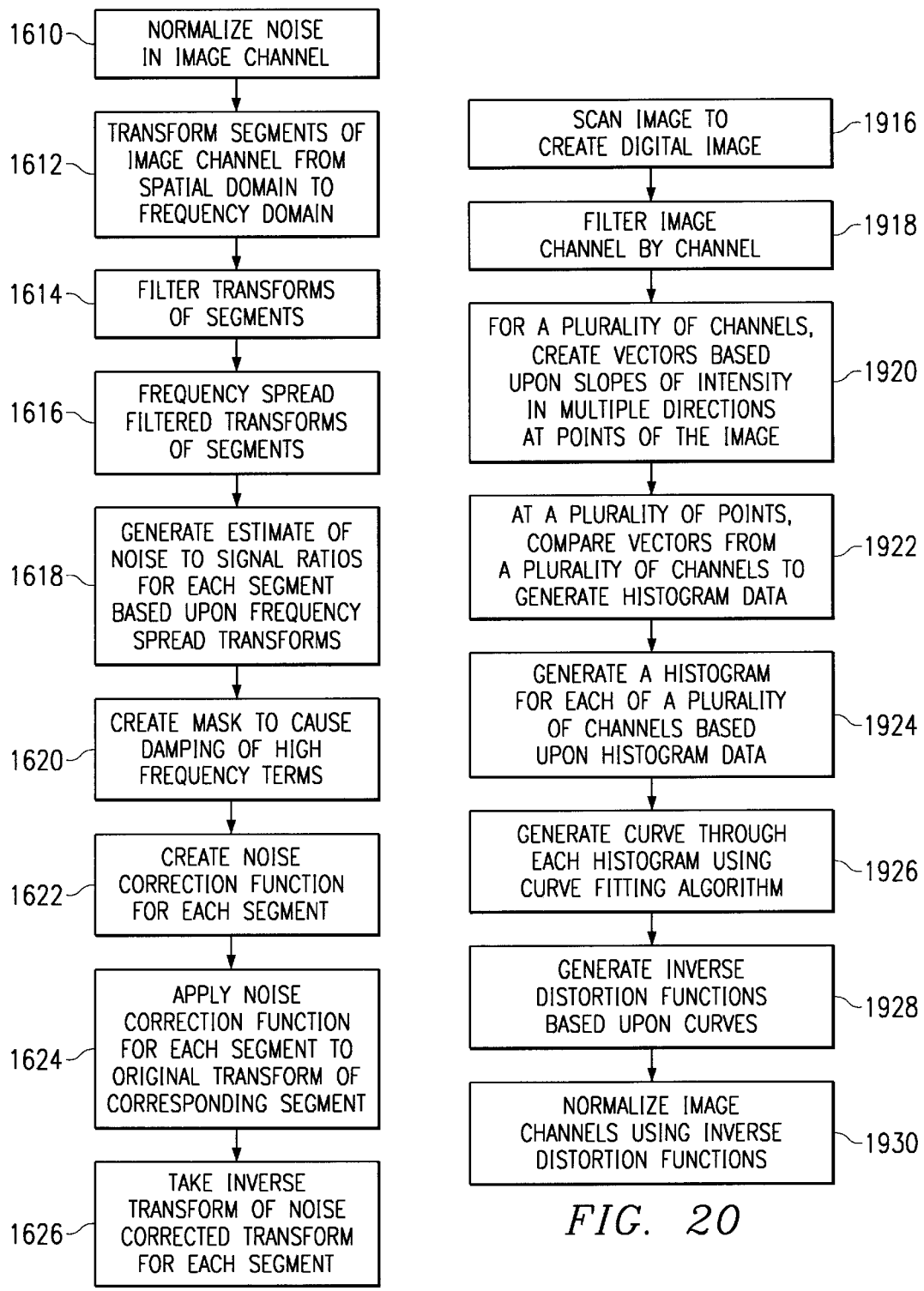
FIG. 16 illustrates a flow chart describing an example of a method for removing high frequency noise, such as grain traces from a digital image.

FIG. 16 illustrates a flow chart describing a method for removing high frequency noise, such as grain traces, from a digital image. The process pictured in FIG. 16 may be applied to one or more channels of the digital image or, to the single channel of the digital image if the digital image only has one channel. For an image with multiple channels, the process described by FIG. 16 could be applied to a subset of the total channels without departing from the scope of the invention. Similarly, the process described in FIG. 16 could be applied differently to each of a plurality of channels in a multichannel digital image without departing from the scope of the invention.

In step 1610, the noise for a particular image channel is normalized. The noise may be normalized using the process described above or through any other process. Alternatively, although it is desirable to normalize the noise before conducting the remainder of the process described by FIG. 16, the process could be applied to an un-normalized digital image.

The process described by FIG. 16 may be applied to a digital image that has had high frequency noise such as grain traces normalized to a magnitude of one in all frequencies. If the grain has been normalized to some value other than one, then the intensity values for the image channel may be scaled to one before applying the remaining steps of the process described by FIG. 16. For example, if the grain was normalized to a magnitude of 100 in all frequencies, then each frequency magnitude could be divided by 100 after performing step 1612 and before performing other steps. In a more complicated example, if each frequency has been normalized for grain or other high frequency noise to a unique value, then the appropriate value may be divided out before the remainder of the processing begins. This division would also occur after the transforms that occur in step 1612.

The process illustrated by FIG. 16 as noted above, may be used for an image having a single channel or multiple channels. Where multiple channels are present, the process described by FIG. 16 can be used. Alternatively, a refined process that takes advantage of the relationship among the channels can be used. Such a process is described in connection with FIG. 17 below.

The description of FIG. 16 assumes that the process is applied to a single channel, M', where M' represents spatially ordered intensity values for each pixel of a digital image. For multichannel images, multiple such channels will exist.

In step 1612, a plurality of segments of the image channel are transformed from the spatial domain to the frequency domain. Such segmentation and transformation may occur according to the methods described above in connection with noise normalization. Any method of segmenting the image can be used and any transform from the spatial domain to the frequency domain can be used. In this embodiment, a segment size of 16 pixels by 16 pixels has been chosen. Other segment sizes could be chosen without departing from the scope of the invention. In addition, as described above, the segments could overlap without departing from the scope of the invention. Similarly, other segment shapes and segment sizes could be used without departing from the scope of the invention.

Figure 18:
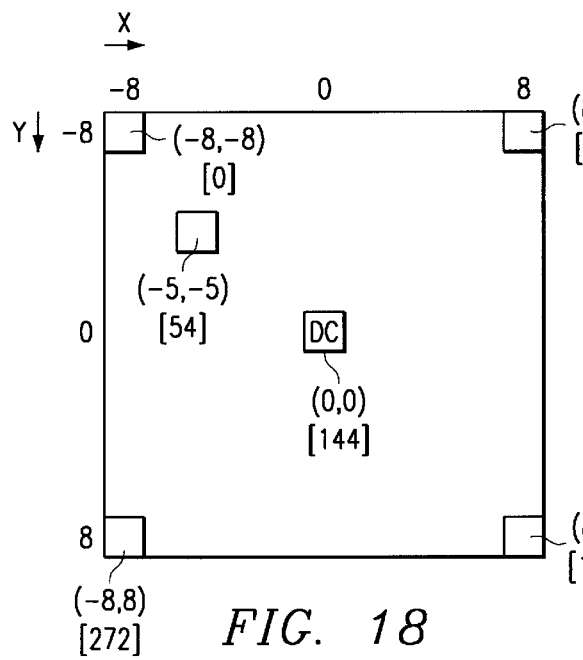
FIG. 18 illustrates one method of representing two-dimensional Fourier transforms in connection with the invention.

For a particular segment, the resulting transform may be referred to as M'T. As noted above, such a transform generally comprises a series of two-dimensional vectors where one component of the vector represents the magnitude of a particular frequency component while the second component of the vector represents the phase at that particular frequency. In this embodiment, the vectors of each transform may be conveniently arranged in two ways to ease the mathematical description of the process performed in FIG. 16. FIG. 18 illustrates these two ways of organization.

In FIG. 18, the vectors are arranged in a 17×17 matrix. The DC frequency term is placed in the center of the matrix and assigned coordinates of (0,0). In addition, as noted in FIG. 18, this vector is also assigned an index of 144. This index is used when the frequency vectors are arranged in a one-dimensional array of vectors. In the one-dimensional array, the DC vector is at index 144. In the two-dimensional array, the frequency vectors are located at an index corresponding to the appropriate change in frequency and in the x and y directions at that location. In the one-dimensional array, the first frequency vector at index 0 of the one-dimensional array is that vector appearing in the upper left hand corner (coordinates −8,−8) of the two-dimensional array illustrated in FIG. 18. The placement of the vectors in the one-dimensional array continues in numerical order if the two-dimensional array is read from left to right across the first row followed by left to right across the second row and so on until the last row. This arrangement is indicated in FIG. 18 by the bracketed one-dimensional array indices that are listed along with the two-dimensional array coordinates for a particular frequency vector.

In step 1614, the transforms of each segment obtained in step 1612 may be filtered. Alternatively, this step may be omitted without departing from the scope of the invention. For convenience and consistency with the process described in connection with FIG. 17, the transform obtained in step 1612 may be referred to as M'T2. This transform may be filtered in such a way so as to emphasize signal content and attenuate noise in the image. A low-pass filter may advantageously be used for this step in the process. A matched filter tends to give smooth attenuation and a reduction in random noise. Thus, although any low-pass filter could be used, a match filter may be a desirable one to use to pull up the valid signal present within the transform and to suppress the noise present within the transform. An RMS calculation may be used to further accentuate the valid signal. The filtering operation tends to preserve strong variations in frequency and suppress small variations in frequency. In other words, strong frequency components which most likely represent valid signal are accentuated.

In this embodiment, the filter comprises a 3×3 matrix having a value of 4 at the center, a value of 2 at the points horizontally and vertically above and below the center, and a value of 1 on the 4 corners of the matrix. Other sizes of filters and other filter values can be used without departing from the scope of the invention. If W(a,b) represents the filter just described, then the filtered transform M'T3 may be calculated according to formula 40.

$$M'T3[x,y] = \sqrt{\frac{\sum_{a=-1}^{1}\sum_{b=-1}^{1} w(a,b)(M'T2(x+a,y+b))^2}{\sum_{a=-1}^{1}\sum_{b=-1}^{1} w(a,b)}} \quad (40)$$

$M'T3[DC]=0$

As noted, the DC term is set to 0 for the filtered transform. In addition, elements beyond the edge of the transform are treated as having a value of 0. This treatment is not explicitly noted in the formula. The filtering operation affects only the magnitude of the frequency vectors. The phase of the frequency vectors remain unchanged. In formula 40, the two-dimensional representation of the transform was used for the calculation. For purposes of notation, the fact that the magnitude of the transform was used is indicated by the fact that ordinary letters (as opposed to bold letters) were used in formula 40 for the transforms M'T2 and M'T3. This notation will be used consistently in describing FIGS. 16 and 17. Where a vector operation is performed, bold letters will be used for the particular transform in question.

In step 1616, the filtered transforms of each segment may be frequency spread. Alternatively, if step 1614 was omitted, then the original transforms obtained in step 1612 may be frequency spread in step 1616. Step 1616 may also be omitted without departing from the scope of the invention.

Because the real world is composed of similar repeating patterns, the transform space of a photographic image tends to have the same appearance for any magnification around the DC frequency except for the presence of reproduction artifacts. For repetitive patterns, the frequency characteristics of an image generally tend to repeat themselves at a power of 2. In this step, the frequency characteristics at lower frequencies are used to pre-sensitize threshold details at twice the frequency.

To perform such frequency spreading, if one uses the two-dimensional version of the transform depicted in FIG. 18, then the center half of the transform data is expanded into the full size block of transform data. In other words, the center 9×9 block of frequencies is spread into every other position in the 17×17 transform. Where a frequency is not filled-in explicitly in the remainder of the transform, the average of neighboring frequencies may be used. Again, this operation affects only the frequency magnitudes.

After the frequency spread filtered transform has been obtained, a new transform may be calculated in step 1618 dependent upon the frequency spread transform and the filtered transform that was obtained in step 1614. Alternatively, if step 1614 was omitted, this new transform may be dependent upon the frequency spread transform and the transform originally obtained in step 1612. Formula 41 may be used to calculate the new transform, M'T4.

$$M'T4[x] = \sqrt{(0.8M'T3[x]^2)^{(0.2M'ET[x])^2}} \quad (41)$$

In formula 41, the transform M'ET represents the estimated transform obtained by frequency spreading. Again, this operation affects only the magnitude of the frequency vectors.

In step 1620, a mask may be created to cause the damping of high frequency terms of the transform obtained in step 1618. Because grain traces tend to have mainly high frequency components, the mask may be used to damp grain traces and/or other high frequency noise.

The mask may be obtained using the gating function represented by formula 42.

$$F_{gate}(x, y) = \sqrt{\frac{x^2 + y^2}{64}} \quad (42)$$

Formula 42 is based upon the two-dimensional representation of the Fourier transform as illustrated in FIG. 18. The x and y terms in formula 42 correspond to the coordinates of particular frequency vectors in the transform when it is arranged in a two-dimensional matrix as illustrated in FIG. 18. Thus, the gating function approaches the square root of 2 for high frequencies and 0 for low frequencies. The mask may then be calculated using formula 43 where B(x,y) comprises the mask in x,y again refers to the coordinates in the two-dimensional transform as illustrated in FIG. 18.

$$B(x,y) = 1 - F_{gate}(x,y) F_{gate} \leq 0.4$$

$$B(x,y) = 0.6\ F_{gate} > 0.4 \quad (43)$$

In this implementation, the mask function is designed to have a minimum value of 0.6. Other mask functions may be used without departing from the scope of the invention. In addition, this step could be omitted without departing from the scope of the invention.

In step 1622, a noise correction function may be calculated for each segment. In this embodiment, the noise correction function is calculated in response to the mask and one of the frequency domain representations of the image that was previously calculated. For example, the transform M'T4 obtained in step 1618 may be used to obtain the noise correction function. The noise correction function may be obtained using formulas 44 and 45.

$$C(x, y) = \frac{M'T4[x, y](0.36)B(x, y)}{2} C \leq 1 + F_{gate}(x, y) \quad (44)$$

$$C(x,y) = 1 + F_{gate}(x,y) C > 1 + F_{gate}(x,y)$$

$$M'TM[x,y] = G_R + (1 - G_R) C(x,y) \quad (45)$$

In formula 44, the noise correction function is capped at a value of 1 plus the gating function for a particular position in the transform matrix. Again, formulas 44 and 45 affect only the magnitude components of the frequency vectors. The user of the invention may desire a residue of graininess to remain after enhancement of the image in accordance with the invention. Thus, the invention allows the user to specify a grain residue $G_R$ that he wishes to remain after the image has been enhanced. Formula 45 takes into account the desired residual grain in calculating the noise correction function M'TM.

In step 1624, the noise correction function for each segment is applied to the original transform for that segment.

The result is a frequency domain representation of the image with high frequency noise such as grain traces suppressed. The grain suppressed frequency representation may be obtained using formula 46.

$$M'TS[x] = M'T[x] M'TM[x] \quad (46)$$

Formula 46 produces a series of vectors comprising the product of the M'T series of vectors and corresponding scalar values in M'TM.

In step 1626, the inverse transform of the noise corrected transform M'TS may be taken for each segment to obtain the spatial domain representation of the enhanced image that has had the noise suppressed.

Figure 17:
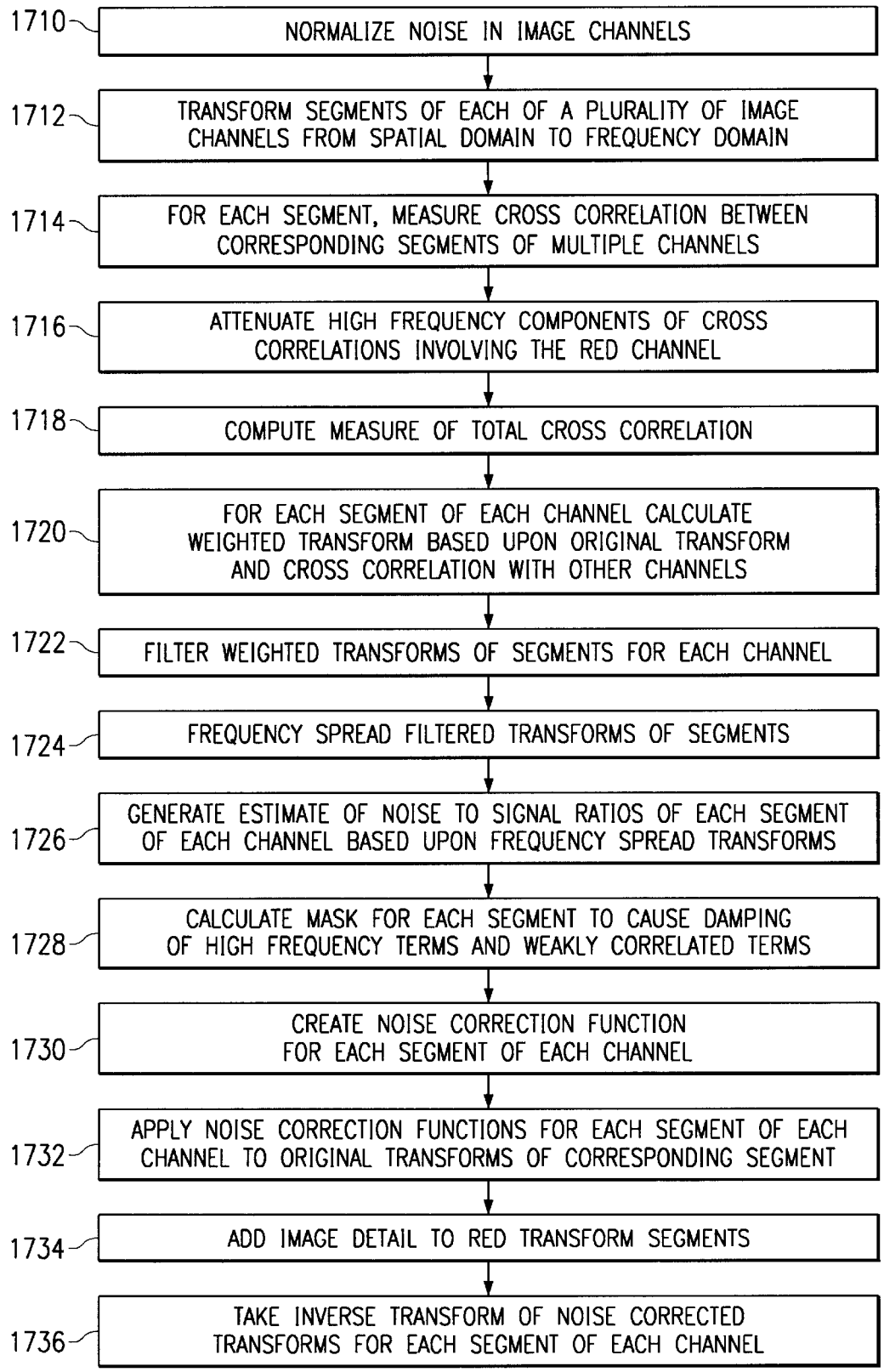
FIG. 17 illustrates a flow chart describing an example of a method for removing high frequency noise, such as grain traces from a digital image.

FIG. 17 illustrates a flow chart describing a method for removing high frequency noise, such as grain traces, from a digital image. The process pictured in FIG. 17 may be applied to digital images with multiple channels. If a digital image only has a single channel, then the process described in connection with FIG. 16 is more desirable to use. One could also use the process described in FIG. 17 for some of a plurality of channels of the digital image while applying the process described in connection with FIG. 16 to others of the plurality of channels.

The process described in connection with FIG. 17 may be applied to any multichannel digital image without departing from the scope of the invention. Examples include digital image representations of color photographs (either a print, negative, or transparency), digital images received from satellites, and medical images. These are only examples, however, of the many potential uses for the invention. The invention is useful for the removal of un-correlated high frequency noise from digital images such as that produced by grain traces.

In step 1710, the noise of each image channel is normalized. The noise may be normalized using the process described above or through any other process. Alternatively, although it is desirable to normalize the noise before conducting the remainder of the process described by FIG. 17, the process could be applied to an un-normalized digital image.

The process described by FIG. 17 may be applied to a digital image that has had high frequency noise, such as grain traces, normalized to a magnitude of 1 in all frequencies. If the grain has been normalized to some value other than 1, then the intensity values for the image channel may be scaled to 1 before applying the remaining steps of the process described by FIG. 17. For example, if the grain was normalized to a magnitude of 100 in all frequencies, then each frequency magnitude could be divided by 100 after performing step 1712 and before performing other steps. In a more complicated example, if each frequency has been normalized for grain or other high frequency noise to a unique value, then the appropriate value may be divided out before the remainder of the processing begins. This division would also occur after the transforms that occur is step 1712.

The process illustrated by FIG. 17 takes advantage of the relationship among multiple channels of a digital image. For convenience, the process illustrated in FIG. 17 will be described below in connection with a digital image representing a color photographic image. Such digital images typically have three channels—a red channel, a green channel and a blue channel. To extend the process described by FIG. 17 to an image with more channels, the cross-correlation functions that are computed below may desirably be extended to take into account all useful cross-correlations. Similarly, if FIG. 17 is to be applied to a dual channel digital image, then the cross-correlations described below may be adjusted to take into account only those two channels.

FIG. 17 applies the process to three channels, R', G' and B'. R' represents spatially ordered intensity values for each pixel of the red channel of a digital image. G' represents spatially ordered intensity values for each pixel of the green channel of a digital image. B' represents spatially ordered intensity values for each pixel of the blue channel of a digital image. The notation used may avoid confusion with earlier formulas.

In step 1712, a plurality of segments of each of the image channels are transformed from the spatial domain to the frequency domain. If high frequency noise is being removed only from a subset of the plurality of image channels, then only those image channels may be transformed or all image channels may be transformed. In other words, if noise is to be removed only from a single channel, the information from the other channels could either be used or not be used to determine the noise content of the channel where noise is to be removed. The segmentation and transformation of each channel may occur according to the methods described above in connection with noise normalization. Any method of segmenting the image channels can be used and any transform from the spatial domain to the frequency domain can be used. In this embodiment, a segment size of 16 pixels by 16 pixels has been chosen. Other segment sizes could be chosen without departing from the scope of the invention. In addition, as described above, the segments could overlap without departing from the scope of the invention. Similarly, other segment shapes could be used without departing from the scope of the invention. Varying shaped and sized segments could also be used.

For a particular segment, the resulting transforms, for the photographic image used as an example of the invention, may be referred to as R'T, G'T, and B'T. As noted above, such a transform comprises a series of two-dimensional vectors where one component of the vector represents the magnitude of a particular frequency component while the second component of the vector represents the phase of that particular frequency. In this embodiment, the vectors of each transform may be conveniently arranged in two ways to ease the mathematical description of the process performed in FIG. 17. FIG. 18 illustrates these two ways of organization. FIG. 18 is described above in connection with the description of FIG. 16.

In step 1714, cross-correlations between corresponding segments of multiple image channels may be calculated for each segment for which a transform was calculated in step 1712. Alternatively, a subset of the segments may be used without departing from the scope of the invention. Because multiple channels of a digital image tend to show the same image pattern, cross-correlated corresponding segments of different channels will tend to be image-detail rather than random noise such as grain. Frequencies that are poorly correlated will tend to represent noise, such as grain traces. Thus, the invention takes advantage of the correlated relationship between channels with respect to image detail. Various embodiments of the invention may take advantage of this relationship in various ways. The mathematical description below provides one example of how cross-correlations can be used for noise removal. However, any mathematical process can be used for noise reduction, including the reduction of grain, in a digital image by performing a calculation proportional to the cross-correlation between channels of a digital image without departing from the scope of the invention.

Formulas 47–49 provide one method for obtaining a measure of the cross-correlation between channels of the digital image.

$$R'G'X[x] = \frac{R'T[x] \cdot G'T[x]}{1 + |R'T[x]||G'T[x]|} \quad (47)$$

where DC=0

$$R'B'X[x] = \frac{R'T[x] \cdot B'T[x]}{1 + |R'T[x]||B'T[x]|} \quad (48)$$

where DC=0

$$G'B'X[x] = \frac{G'T[x] \cdot B'T[x]}{1 + |G'T[x]||B'T[x]|} \quad (49)$$

where DC=0

These formulas may be applied to each frequency vector of each segment of the digital image. The result of the calculations and formulas 47–49 is a matrix of cross-correlation scalar values where each value is proportional to the cross-correlation between two frequency vectors in different channels wherein the frequency vectors represent the same frequency in spatially corresponding segments of the two channels. For convenience, formulas 47–49 use the one-dimensional matrix of vector representations of the spatial frequency domain transforms of the image segments discussed in connection with FIG. 18. Accordingly, the numerator of each formula is a dot product between two vectors while the denominator of each formula takes into account the magnitude of each of these vectors. The resulting matrix for formula 47 is proportional to the cross-correlation between the red and green channels at particular frequencies for a particular segment. The result produced by formula 48 is proportional to the cross-correlation between the red and blue channels of particular frequencies of a particular segment of the digital image. The matrix resulting from formula 49 is proportional to the cross-correlation between the green and blue channels of a particular segment of the digital image at various frequencies. Such a matrix may be computed for each segment of the digital image for each of the three formulas. The DC term of the cross-correlation is set to 0. The notation R'G', R'B', and G'B' is used to avoid confusion with the formulas given above for grain normalization. To avoid confusion, the notation R'T, B'T, and G'T is used to represent the transforms obtained in step 1712.

For large in-phase frequency vectors, the results of formulas 47–49 tend to approach a value of one, and for large out-of-phase vectors, approach negative one. Very small vectors tend to cause a result which approaches zero while vectors which are in-phase and have magnitudes of about one yield a result of about 0.5.

In step 1716, high frequency components of the cross-correlations involving the red channel may be attenuated. Alternatively, this step may be omitted without departing from the scope of the invention. Typically, color film used to produce photographic images has a green layer that the light passes through followed by a blue layer and then a red layer. Because the red layer receives the light after it has passed through the green and blue layers, the image in the red layer is slightly blurred in comparison to the green and blue layers. The red layer tends to lack high frequency information that constitutes image information. Instead, most high frequency information from the red channel tends to be noise and may be rejected. If a different type of color film is used, then it may be desirable to attenuate a different channel of the digital image. In addition, if other images such as satellite images or medical images have channels that tend to lack high frequency image content, then the high frequency components of those image channels may be attenuated using the method described below, or using a similar method.

Formula 50 describes one red frequency attenuation function that may be used with the invention.

$$RFA(x, y) = \frac{1}{\left(\frac{x}{5}\right)^2 + \left(\frac{y}{5}\right)^2 + 1} \quad (50)$$

$$RFA(0,0)=0$$

In formula 50, x corresponds to the x coordinate and y to the y coordinate for a particular point in the two-dimensional array representation of frequency vectors illustrated in FIG. 18. The DC value at coordinates (0,0) is set to 0. Although the red frequency attenuation value may conveniently be calculated using the coordinates corresponding to the location of each frequency vector in the two-dimensional arrangement of the frequency transforms illustrated in FIG. 18, the results of the calculations for formula 50 may be stored in a matrix of values where each value in the matrix comprises the result of formula 50 and the location of that value in the matrix corresponds to the appropriate position of the corresponding frequency in the one-dimensional array of vectors representation of the frequency transform. For example, using the exemplary transform illustrated in FIG. 18, the value for RFA[288] would be formula 50 applied to the coordinates 8,8, while the value for RFA[144] would be the value for RFA(0,0).

After the red frequency attenuation values have been calculated using formula 50, these values may be applied to the cross-correlation between the red and green channels using equation 51 and applied to the cross-correlation between the red and blue channels using equation 52.

$$R'G'X2[X]=RFA[X]R'G'X[X] \quad (51)$$

$$R'B'X2[X]=RFA[X]R'B'X[X] \quad (52)$$

Each of these equations comprises, for each frequency, a multiplication of two scalar values. Although one method of attenuating high frequency red information has been illustrated, other methods could be used without departing from the scope of the invention.

In step 1718, a measure of the total cross-correlation between channels may be calculated. This computation is made for each segment of the digital image and is a representation of the total cross-correlation between the various image channels in that segment.

Although any measure proportional to the total cross-correlation between channels may be used, formulas 53–56 provide one measure of the total cross-correlation for a particular segment.

$$CCC1 = \sum_{x=0}^{288} (RFA[X](R'T[X]G'T[X])) + (B'T[X]G'T[X]) \quad (53)$$

but is constrained such that $CCC1 \geq 1.0$ $$CCCN = \sum_{x=0}^{288} RFA[X] \quad (54)$$

$$CCC2 = CCC1/1.2\sqrt{CCCN} \quad (55)$$

$$CCC3 = \frac{0.25CCC2}{1 + CCC2(0.25)} \quad (56)$$

In this embodiment, formula 53 applies a measure of cross-correlation that takes into account only the cross-correlation between the red and green channels and the blue and green channels. Because the image passes through other layers of photographic film to reach the red and blue layers, the cross-correlation between the red and blue layers typically does not add any valuable information concerning similar image detail. Accordingly, that term has been omitted from formula 53. Such a term could be used, however, with or without frequency attenuation without departing from the scope of the invention. In addition, for the reasons described above in connection with the red frequency attenuator, the cross-correlation measure between the red and green channel is attenuated in formula 53. Formula 53 calculates the total cross-correlation over the entire frequency domain, in this case using the example of 289 vectors used in the example of FIG. 18. Formula 54 reflects a measure of the cumulative weight added by the red frequency attenuation. Finally, formulas 55 and 56 may be applied such that the resulting cross-correlation measure ranges from 0–1 and is approximately 0.2 when no image detail is present.

In step 1720, a weighted transform may be calculated for each segment of each channel based upon the original transform computed in step 1712 and the cross-correlation of the channel in question with other channels. Any weighted transform could be used that is responsive to any measure of the cross-correlation between one or more channels of the digital image without departing from the scope of the invention. In this embodiment, the weighted transform may be calculated using formulas 57–59.

$$R'T2[X]=|R'T[X]|+0.9R'G'X2[X]+0.7R'B'X2[X]$$

but is constrained such that $R'T2[X] \geq 0$ $$DC=0 \quad (57)$$

$$G'T2[X]=|G'T[X]|+0.9G'B'X[X]+0.7R'G'X2[X]$$

but is constrained such that $G'T2[X] \geq 0$ $$DC=0 \quad (58)$$

$$B'T2[X]=|B'T[X]|+0.9G'B'X[X]+0.7R'B'X2[X]$$

but is constrained such that $B'T2[X] \geq 0$ $$DC=0 \quad (59)$$

In each case, the DC term of the weighted transform is set to zero. In addition, each component of the weighted transform is also limited to a value greater than or equal to zero. Note that formulas 57–59 operate only on the magnitude portions of the frequency transforms and produce a revised magnitude value for each transform. The phase information for each transform is preserved.

In step 1722, the weighted transforms obtained in step 1720 may be filtered for each segment of each channel. Alternatively, this step may be omitted without departing from the scope of the invention. In addition, if step 1720 was omitted, then the transforms obtained in step 1712 may be filtered for each channel. Each transform may be filtered in such a way so as to emphasize signal content and attenuate noise in the image. A low-pass filter may advantageously be used for this step in the process. A matched filter tends to give smooth attenuation and a reduction in random noise. Thus, although any low-pass filter could be used, a matched filter may be a desirable one to use to pull up the valid signal present within the transform and to suppress the noise present within the transform. An RMS calculation may be used to further accentuate the valid signal. The filtering operation tends to preserve strong variations in frequency and suppress small variations in frequency. In other words, strong frequency components which most likely represent valid signals are accentuated.

In this embodiment, the filter comprises a 3×3 matrix having a value of 4 at the center, a value of 2 at the points horizontally next to and vertically above and below the center, and a value of 1 on the 4 corners of the matrix. Other sizes of filters and other filter values can be used without departing from the scope of the invention. If W(a,b) represents the filter just described, then the filtered transforms R'T3, G'T3 and B'T3 may be calculated according to formulas 58–62.

$$R'T3[x, y] = \sqrt{\sum_{a=-1}^{1}\sum_{b=-1}^{1} \frac{W(a, b)(R'T2[x+a, y+b])^2}{\sum_{a=-1}^{1}\sum_{b=-1}^{1} W(a, b)}} \tag{60}$$

$$R'T3[DC]=0$$

$$G'T3[x, y] = \sqrt{\frac{\sum_{a=-1}^{1}\sum_{b=-1}^{1} W(a, b)G'T2[x+a, y+b]^2}{\sum_{a=-1}^{1}\sum_{b=-1}^{1} W(a, b)}} \tag{61}$$

$$G'T3[DC]=0$$

$$B'T3[x, y] = \sqrt{\frac{\sum_{a=-1}^{1}\sum_{b=-1}^{1} W(a, b)B'T2[x+a, y+b]^2}{\sum_{a=-1}^{1}\sum_{b=-1}^{1} W(a, b)}} \tag{62}$$

$$B'T3[DC]=0$$

As noted, the DC term is set to zero for each filtered transform. In addition, elements beyond the edge of the transform are treated as having a value of zero. This treatment is not explicitly noted in the formula. The filtering operation affects only the magnitude of the frequency vectors. The phase of the frequency vectors of each transform remains unchanged. In formulas 60–62, the two-dimensional representation of the transforms were used for the calculations. For purposes of notation, the fact that the magnitude of the transform was used is indicated by the fact that ordinary letters (as opposed to bold letters) were used in formulas 60–62 for the transform R'T2, R'T3, G'T2, G'T3, B'T2 and B'T3.

In step 1724, the filtered transforms for each segment of each channel may be frequency spread. Alternatively, if step 1722 was omitted, then the transforms obtained in step 1720 or the transforms obtained in step 1712 may be frequency spread in step 1724. Step 1724 may also be omitted without departing from the scope of the invention.

Because the real world is composed of similar repeating patterns, the transform space of a photographic image tends to have the same appearance for any magnification around the DC frequency except for the presence of reproduction artifacts. For repetitive patterns the frequency characteristics of an image tend to repeat themselves at a power of two. In this step, the frequency characteristics at lower frequencies are used to pre-sensitize threshold details at twice the frequency. To perform such frequency spreading, if one uses the two-dimensional version of the transform depicted in FIG. 18, then the center half of the transform data is expanded into the full size block of transform data. In other words, the center 9×9 block of frequencies is spread into every other position in the 17×17 transform. Where a frequency is not filled-in explicitly in the remainder of the transform, the average of neighboring frequencies may be used. Again, this operation affects only the frequency magnitudes. The existing phase information, even for the frequencies where the magnitude has changed that are not in the center half of the transform is preserved.

After the frequency spread filter transforms have been obtained, a new transform may be calculated in step 1726 for each channel. The new transform may depend upon the frequency spread transform for that channel and the filtered transform for that channel that was obtained in step 1722. Alternatively, if step 1722 was omitted, this new transform may depend upon the frequency spread transform and the transform originally obtained in step 1712. Formulas 63–65 may be used to calculate the new transforms, R'T4, G'T4 and B'T4.

$$R'T4[X]=\sqrt{0.8R'T3[X]^2+0.2R'ET[X]^2} \tag{63}$$

$$G'T4[X]=\sqrt{0.8G'T3[X]^2+0.2G'ET[X]^2} \tag{64}$$

$$B'T4[X]=\sqrt{0.8B'T3[X]^2+0.2B'ET[X]^2} \tag{65}$$

In formulas 63–65, the transforms R'ET, G'ET, and B'ET represent the estimated transforms obtained by frequency spreading in step 1724. Again, the operation performed by formulas 63–65 affects only the magnitude of the frequency vectors. Phase information is preserved.

In step 1728, a mask may be created to cause the damping of high frequency terms of the transform obtained in step 1726. Because grain traces tend to have mainly high frequency components, the mask may be used to damp grain traces and/or other high frequency noise.

The mask may be obtained using the gating function represented by formula 42. Formula 43 may then be used to obtain the mask. Both formula 42 and formula 43 are described above in connection with FIG. 16. Other mask functions and/or gating functions may be used without departing from the scope of the invention. In addition, this step could be omitted without departing from the scope of the invention.

In step 1730, a noise correction function may be calculated for each segment of each color channel. In this embodiment, the noise correction function is calculated in response to the mask and one of the frequency domain representations of the image that was previously calculated. For example, the transforms obtained in step 1726 may be used to obtain the noise correction function. The noise correction function may be obtained using formulas 66–71. B(x,y) in these formulas comes from formula 43.

$$C_R(x, y) = \frac{R'T4[x, y]0.36(1 + 0.4CCC3)B(x, y)}{2} \quad (66)$$

$$C_R \leq 1 + F_{gate}(x, y)$$

$$C_R(x,y) = 1 + F_{gate}(x,y) C_R > 1 + F_{gate}(x,y)$$

$$C_G(x, y) = \frac{G'T4[x, y]0.36(1 + 0.4CCC3)B(x, y)}{2} \quad (67)$$

$$C_G \leq 1 + F_{gate}(x, y)$$

$$C_G(x,y) = 1 + F_{gate}(x,y) C_G > 1 + F_{gate}(x,y)$$

$$C_B(x, y) = \frac{B'T4[x, y]0.36(1 + 0.4CCC3)B(x, y)}{2} \quad (68)$$

$$C_B \leq 1 + F_{gate}(x, y)$$

$$C_B(x,y) = 1 + F_{gate}(x,y) C_B > 1 + F_{gate}(x,y)$$

$$R'TM[x,y] = G_R + (1 - G_R)C_R(x,y) \quad (69)$$

$$G'TM[x,y] = G_R + (1 - G_R)C_G(x,y) \quad (70)$$

$$B'TM[x,y] = G_R + (1 - G_R)C_B(x,y) \quad (71)$$

In formulas 66–68, the noise correction function is capped at a value of 1 plus the gating function for a particular position in the transform matrix. Again, formulas 66–68 and 69–71 affect only the magnitude components of the frequency vectors. The original phase information is preserved. The user of the invention may desire a residue of graininess to remain after enhancement of the image in accordance with the invention. Thus, the invention allows the user to specify a grain residue $G_R$ that he wishes to remain after the image has been enhanced. Formulas 69–71 take into account the desired residual grain in calculating the noise correction functions R'TM, G'TM and B'TM.

In step 1732, the noise correction function for each segment for each channel is applied to the original transform for the appropriate segment of the appropriate channel. The result is a frequency domain representation of the image with high frequency noise such as grain traces suppressed. The grain suppressed frequency representation may be obtained using formulas 72–74.

$$RTS[X] = RT[X]RTM[X] \quad (72)$$

$$GTS[X] = GT[X]GTM[X] \quad (73)$$

$$BTS[X] = BT[X]BTM[X] \quad (74)$$

Formulas 72–74, again, comprise an operation on the magnitude components of the frequency vectors and phase information remains unchanged.

In step 1734, image detail may be added to the frequency domain representation of each segment of the red channel of the image. As noted previously, light typically passes through the blue and green layers of color film before reaching the red layer of the film. Accordingly, detail tends to become blurred in the red portions of an image. In step 1734, such detail can be restored to the red channel of an image using information from the green and blue channels. Note that step 1734 could be performed on the red channel of any digital image, not just on the red channel after the steps of FIG. 17 have been applied. Accordingly, step 1734 may be omitted without departing from the scope of the invention. In addition, step 1734, standing alone, may comprise one embodiment of the invention. Because the green channel of the image tends to have the most image detail, it may be used to add detail to other channels. The technique described for step 1734 could also be applied to add detail to a different channel for different types of digital images or for digital images obtained from color film structured differently than typical color film. Other methods of enhancing red image detail could be used without departing from the scope of the invention. In this embodiment, formula 75 may be used to calculate a revised red channel transform for each segment, R'TS, for each segment of the red channel.

$$R'TS[X] = \frac{1}{1 - RFA[X] + RFA[X]^2}(R'TS[X]RFA[X] + \quad (75)$$

$$(1 - RFA[X])(0.7G'TS[X] + 0.4B'TS[X]))$$

Formula 75 employs the red frequency attenuator described above in connection with step 1716.

In step 1736, the inverse transforms of the noise corrected transforms, are R'TS, G'TS and B'TS may be taken for each segment to obtain the spatial domain representation of the enhanced image that has had the noise suppressed. If image detail has been added in step 1734, then the red channel transforms obtained using formula 75 may be used.

Balancing the Color Channels

After normalizing the grain traces, the normalized values obtained through the correction arrays may be employed to balance the color content of the digital image, as shown in step 1014 of FIG. 3. Alternatively, color may be balanced without using the normalized values.

The original values of a digital image often contain distortions from a scanner's attempts to improve the digital image and from distortions in the original film image from the aging of the film. These distortions may consist of color patterns that no longer reflect the random and even distribution of the grains in the color layers of the original film. By using the normalized values for grain traces obtained by the end of steps 1008 and 1010 of FIG. 3, (or by other methods) the present invention can also create an estimated reconstruction of the original color values. These reconstructed values can be called balanced in the sense that they are more evenly distributed through the normalized digital image than in the original digital image. In other words, balancing the color content may further enhance the digital image.

To balance the color content, the lowest value, which is the darkest pixel intensity value among the digital image's normalized values is found for each channel. The highest value, which is the brightest pixel intensity value among the digital image's normalized values, is also found for each color channel. An improvement on this technique uses the lowest and highest values from a low-passed version of the digital image. One low-pass filter that has been found to be advantageous for this process is a median filter with a radius of typically over 3 pixels. Alternately, the radius can be proportional to the square root of the largest linear dimension of the digital image in pixels. The software then redistributes the pixel intensity values to fit the particular bit depth (range of intensities) appropriate to the hardware of the particular embodiment of the present invention.

For example, the following table represents a range of normalized pixel intensity values from an estimated reconstruction of a digital image:

```
R  3.5_____20.34
G  2.6_____27.9
B        10.1_____33.4
```

To improve the visual display of these values, the following equation for each color channel using the non-low-passed data may be used:

$$\text{balanced value} = \frac{(\text{normalized value} - \text{darkest pixel})}{\text{brighest pixel} - \text{darkest pixel}} \cdot 255$$

The balanced values from the entire example then are

```
R  0_____255
G  0_____255
B  0_____255
```

Other methods of color enhancement or of correcting nonlinear distortion between related signals may be used, with or without grain normalization and/or reduction. Any such method may be used without departing from the scope of the invention.

Figure 19:
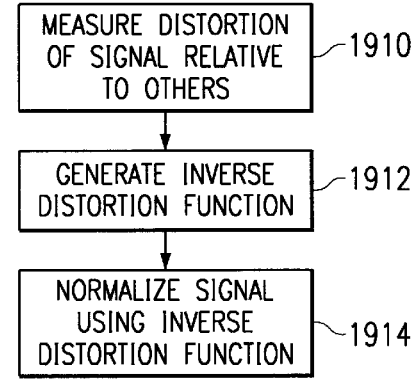
FIG. 19 illustrates a flow chart describing the steps of an example process that may be used to normalize a plurality of signals having a shared component wherein at least one of the plurality of signals has been distorted in a nonlinear way.

FIG. 19 illustrates a flow chart describing the steps of a process that may be used to normalize a plurality of signals having a shared component wherein at least one of the plurality of signals has been distorted in a nonlinear way. Although this aspect of the invention may be used to enhance the colors of a digital image comprising a scanned photographic image, the process described in FIG. 19 may be used in a number of additional applications. For example, it may be used to correct nonlinear distortion in any plurality of signals having a shared component. Thus, it could be used in applications such as audio applications, medical imaging applications, satellite imaging applications, etc. The process described in FIG. 19 could be used for any of these applications without departing from the scope of the invention.

In step 1910, the distortion of one of the plurality of signals is measured relative to the other signals. A distortion function may be generated for a signal which is proportional to the distortion of that signal relative to at least one of the remaining signals and the plurality of signals. Although distortion can be measured relative to only one of the remaining related signals, distortion relative to many or all of the remaining signals may advantageously be measured. As described below, for a digital image comprising three color channels, distortion of one color channel may be measured relative to the other two color channels.

In step 1912, an inverse distortion function may be generated based upon the distortion that was measured in step 1910. Such an inverse distortion function may be generated for one, some, or all of the plurality of signals having a shared component.

In step 1914, a signal may be normalized using the inverse distortion function calculated in step 1912. Again, one, some or all of the plurality of signals may be normalized based upon inverse distortion functions calculated in step 1912.

In some embodiments of the invention, it may be desirable to filter one or more of the plurality of signals prior to determining the distortion function in step 1910. Such filtering may be desirable where noise and/or other effects may interfere with the calculation of an accurate distortion function. For example, a median type filter may be useful to remove distortion.

The invention may desirably be used to correct nonlinear distortion in a plurality of signals where each signal or more than one signal has been distorted in a nonlinear way, but where it is difficult to determine whether one, some, or all of the signals have been distorted relative to one another. For such related signals, distortion may be corrected by causing the plurality of signals to vary by relatively equal amounts over small steps in the signal. For signals that are a function of a single variable, the distortion function calculated in step 1910 may be one that depends upon the slope of one, some, or all of the plurality of signals at a plurality of points in the image. In such a case, the inverse distortion function generated in step 1912 may seek to equalize the slopes of the plurality of signals over small increments in the signal. For signals that are a function of multiple variables, the distortion function may depend upon the rate of change of one, some, or all of the plurality of signals in a plurality of directions at a plurality of points in the signals. The distortion function calculated in step 1910 may, for example, depend upon the gradient of one, some, or all of the plurality of signals at a plurality of points.

Where a gradient measure is used to determine the distortion of one signal relative to others, a scatter plot may be used to create the distortion function. Each point on the scatter plot may be derived by computing a scatter plot index in response to the magnitude of the gradients of some of the plurality of signals at a common point in the signals. A weight may be computed in response to the angle between these gradients (for example, the cosine of the angle between the gradients). In addition, such a weight may be proportional to the magnitudes of the gradients. A curve may be fit to the points on the scatter plot using a curve-fitting algorithm and an inverse distortion function may be calculated using the curve. For example, the inverse distortion function may be proportional to the area under the curve.

FIG. 20 illustrates a flow chart describing a process that may be used to enhance a digital image in accordance with the invention. This aspect of the invention may be used to enhance the colors of a digital image. Digital images, whether they be scanned photographic images, satellite images, medical images, or other types of digital images may be distorted in a nonlinear way either due to some distortion in the analog image and/or due to distortion that occurs during the creation of the digital image. The distortion may vary with respect to density and/or frequency and may vary differently for each channel. Such nonlinear distortion may degrade the image in an undesirable way. For photographic images, the image may not look as pleasing to the eye. For satellite images and medical images, the information provided by the image may not be as useful due to such distortion.

Many digital images are comprised of multiple channels, as discussed above. For example, a digital image based upon a color photograph will ordinarily be comprised of a red channel, a green channel, and a blue channel. Where an image is made up of multiple channels, the image information contained in each channel creates a shared component between the three image channels. Thus, over small areas in the digital image, the intensity tends to vary by equal amounts across small areas in the image. Although the magnitudes of intensity may be quite different, the rate of change of such magnitude tends to be similar for a non-distorted image. Thus, the invention seeks to determine distortion of an image based upon the variation of intensity in multiple directions for each channel (or a subset of the channels) of the image. An inverse distortion function may be generated for one, some, or all of the channels of an image such that when the inverse distortion function is applied, the intensity of each channel tends to vary by equal amounts when compared to other channels over small areas of the image.

In areas of some images, the intensity values of one channel as compared to another channel tend to vary linearly when the image is undistorted, while in other images or in areas of the same image, the intensity in one channel as compared to another channel tends to vary such that a constant ratio between the magnitudes is maintained over small areas when the image is undistorted. To automate the enhancement of color digital images, the invention utilizes an average of these two types of variation which corresponds to the way a color image tends to be stored digitally.

In step 1916, an image is scanned to create a digital image. Such scanning may occur using scanner 30 or scanner 34 as described above. Alternatively, step 1916 may be omitted and the invention applied to an image that has previously been scanned. In addition, the invention may be applied to digital images with a plurality of channels each having a common signal component that has had one or more of the channels distorted in a nonlinear way. The term "common component" is meant to broadly refer to signals that are correlated in some manner.

Optionally, before performing the remaining steps in the process described in FIG. 20, the grain normalization aspect of the invention discussed above may be applied to a digital image. Optionally, one or more of the grain reduction techniques described above may also be applied to the image before performing the remaining steps of the process described by FIG. 20. Alternatively, the process described in FIG. 20 may be applied to an image without any grain normalization and/or grain reduction or after normalization or reduction using a different technique.

In step 1918, each channel of the image (or a subset of the channels of the image) may be filtered so that various effects, such as noise and image resolution effects, do not interfere with the removal of nonlinear distortion. Over a small number of pixels, noise such as noise caused by grain may interfere with the removal of nonlinear distortion. In addition, because the light used to create a color photographic image passes through multiple layers of the film, one or more color channels of the digital image may be distorted. As discussed above, the red layer of color film tends to receive light only after it has passed through the green and blue layers of the film. Thus, the image tends to be slightly more distorted in the red layer of the film as compared to the green and blue layers. For example, the image may be less sharp in the red channel. Such optical distortion may interfere with removing nonlinear distortion in the colors of the image.

Accordingly, in step 1918, each channel of the image may be pre-blurred by filtering the image. In this embodiment, a median filter with a radius of 10 pixels may be used for film scanned at 2,000 dpi for each color channel. A different radius may be used without departing from the scope of the invention. In addition, different scanning resolutions may be used without departing from the scope of the invention. Other methods may be used to pre-blur the image other than applying a median filter. Essentially, each channel of the image may be altered so as to damp or eliminate noise and resolution effects such as those discussed above.

In step 1920, for at least two channels of the digital image, vectors are created based upon the rate of change of intensity (slope) in multiple directions at multiple points of the image. In this embodiment, such vectors are created for each of the plurality of channels, but could be created for only a subset of the plurality of channels without departing from the scope of the invention. In this embodiment, slopes may be calculated to create vectors at all points of the image or at a subset of the points of the image without departing from scope of the invention.

In this embodiment, the vectors created represent a gradient of the intensity for a particular image channel at the point in question. In other words, the vector comprises a first component representing the slope of the intensity in the x-direction and a second component representing the slope of intensity in the y-direction at a particular point in that image channel. Vectors proportional to the slopes of intensity at points of the image in other directions could also be chosen without departing from the scope of the invention. Slopes in the x and y directions are chosen only for convenience.

The vectors for the red, green and blue channels, R"2(x, y), G"2(x,y), and B"2(x,y), respectively, may be calculated for a particular point (x,y) may be calculated using formulas 76–78, where i and j represent unit vectors in the x and y directions respectively.

$$R"2(x,y)=(R"(x+1,y)-R"(x-1,y))i+(R"(x,y+1)-R"(x,y-1))j \quad (76)$$

$$G"2(x,y)=(G"(x+1,y)-G"(x-1,y))i+(G"(x,y+1)-G"(x,y-1))j \quad (77)$$

$$B"2(x,y)=(B"(x+1,y)-B"(x-1,y))i+(B"(x,y+1)-B"(x,y-1))j \quad (78)$$

In these formulas, R", G" and B" represent the filtered intensity values for the three image channels. Thus, a vector may be calculated for each point of each channel of a digital image. For images with more or less channels, similar formulas could be used for each channel. Vectors may be calculated for only a subset of the points of each channel without departing from the scope of the invention. Formula 76–78 do not describe calculations for slope at the edge of the image channels. At such edges, different measures of slope may be used or these points may be ignored without departing from the scope of the invention. Similarly, different methods of calculating slope may be used without departing from the scope of the invention. This embodiment utilizes points directly to the left and right of the pixel in question, but not the pixel in question itself, to calculate the approximate slope in the x-direction at that point. A similar method is used for the y-direction. Alternatively, more pixels could be used in the x- or y-directions to calculate the x-direction or y-direction slopes without departing from the scope of the invention. In addition, some average of approximate slopes could be used for a particular pixel without departing from the scope of the invention.

In step 1922, vectors may be compared from a plurality of channels to generate scatter plot data useful for generating a distortion function representative of the distortion of one channel of the image compared to other channels of the image. Again, such scatter plot data may be generated for one, some, or all of the channels without departing from the scope of the invention. In addition, the comparison of vectors done to create the scatter plot data may involve some, or all of the other channels of the image.

In this embodiment, the scatter plot data depends upon the vectors calculated in step 1920. Because undistorted images will tend to have gradient vectors having a similar direction, a weight may be calculated for each point on the scatter plot proportional to the dot product between the vectors calculated in step 1920. In this embodiment, for a particular channel, such a dot product is calculated for each of the other channels and a point is plotted for each such dot product. For example, for the red scatter plot, a point is plotted with a weight proportional to the dot product of the vector calculated in step 1920 for the red channel and the green channel. In addition, a weight is calculated for a point to be placed on the scatter plot for the red channel that is proportional to the dot product of the vectors at that point calculated in step 1920 for the red channel and blue channels. Thus, the weight of a particular point on the scatter plot may be proportional to the similarity between the slopes of the intensity of two channels at a particular point. Because the channels are distorted relative to one another, this embodiment of the invention determines scatter plot points for a particular channel that compare the slope at a particular point of the channel in question versus the slopes of intensity at the corresponding point in each additional channel. Alternatively, a comparison could be made to a subset of the channels without departing from the scope of the invention.

The invention determines one index of the scatter plot utilizing the relative magnitude of the slope vector for a particular point that was created in step 1920 for a particular channel in comparison to the magnitude of the slope vector that was calculated in step 1920 for a corresponding point in another channel of the image.

The other index of the scatter plot comprises the intensity of a point in the image channel.

Accordingly, the points of the scatter plot may be generated as follows. A scatter plot is generated for each channel of the image that is to have distortion corrected. In this example, a scatter plot is generated for the red channel, the green channel, and the blue channel. The x-axis index of the scatter plot is the intensity of the pixel in question. The y-axis index of the scatter plot is a value between 1 and −1 corresponding to the relative magnitude of the slope vectors at a point for that particular channel compared to the magnitude of the slope vector of another channel of the image at a corresponding point. The weight assigned to a particular point is as described above. Accordingly, a particular point on the red, green, or blue scatter plots may be located using formulas 79–93. In the case of a negative result in formulas 85–90, the weight value may be set to a predetermined value such as zero.

$$Y_{1R''2(x,y)} = \left(1 - \frac{2|R''2|}{|R''2|+|G''2|}\right) \quad (79)$$

$$Y_{2R''2(x,y)} = \left(1 - \frac{2|R''2|}{|R''2|+|B''2|}\right) \quad (80)$$

$$Y_{1G''2(x,y)} = \left(1 - \frac{2|G''2|}{|R''2|+|G''2|}\right) \quad (81)$$

$$Y_{2G''2(x,y)} = \left(1 - \frac{2|G''2|}{|G''2|+|B''2|}\right) \quad (82)$$

$$Y_{1B''2(x,y)} = \left(1 - \frac{2|B''2|}{|R''2|+|B''2|}\right) \quad (83)$$

$$Y_{2B''2(x,y)} = \left(1 - \frac{2|B''2|}{|B''2|+|G''2|}\right) \quad (84)$$

$$W_{1R''2(x,y)} = \frac{R''2 \cdot G''2}{\sqrt{|R''2||G''2|}} \quad (85)$$

$$W_{2R''2(x,y)} = \frac{R''2 \cdot B''2}{\sqrt{|R''2||B''2|}} \quad (86)$$

$$W_{1G''2(x,y)} = \frac{G''2 \cdot R''2}{\sqrt{|G''2||R''2|}} \quad (87)$$

$$W_{2G''2(x,y)} = \frac{B''2 \cdot G''2}{\sqrt{|G''2||B''2|}} \quad (88)$$

$$W_{1B''2(x,y)} = \frac{B''2 \cdot R''2}{\sqrt{|B''2||R''2|}} \quad (89)$$

$$W_{2B''2(x,y)} = \frac{B''2 \cdot G''2}{\sqrt{|B''2||G''2|}} \quad (90)$$

$$X_{R(x,y)} = R''(x,y) \quad (91)$$

$$X_{G(x,y)} = G''(x,y) \quad (92)$$

$$X_{B(x,y)} = B''(x,y) \quad (93)$$

Formula 91 indicates that the x-axis index of the scatter plot is determined for a particular point by determining the intensity of the red channel at that particular point. For that particular point of the red channel, two points will be plotted. Each will have the same x-index in the red scatter plot. For the two points plotted, one point corresponds to a comparison between the slope vectors for the red and green channels at the particular point while the other point corresponds to a comparison between the red and blue vectors at a particular point. For the point representing a comparison between the red and green vectors, formula 79 may be used to determine the y-index for the scatter plot. For the comparison between the red and blue vectors in a particular point, the y-index for the point on the scatter plot may be determined using formula 80. The weight of the point on the scatter plot for the comparison of the red channel to the green channel may be calculated using formula 85 while the weight for the point representing the comparison between the red and blue channels may be determined using formula 86.

For any point in the green channel, two points may also be generated for the green scatter plot. In each case, the x-axis index for the green scatter plot is determined using formula 92. For the first point corresponding to a comparison between the vectors for the green channel and the red channel, formula 81 is used to determine the y-axis index on the green scatter plot for the point while formula 87 represents the weight to be plotted at that point. For the point corresponding to a comparison between the vectors at the particular point for the green channel and the blue channel, formula 82 may be used to determine the y-axis index while formula 88 is used to determine the weight for that particular point.

For any point in the blue channel, two points may also be generated for the blue scatter plot. In each case, the x-axis index for the blue scatter plot is determined using formula 93. For the first point corresponding to a comparison between the vectors for the blue channel and the red channel, formula 83 is used to determine the y-axis index on the blue scatter plot for the point while formula 89 represents the weight to be plotted at that point. For the point corresponding to a comparison between the vectors at the particular point for the blue channel and the green channel, formula 84 may be used to determine the y-axis index while formula 90 is used to determine the weight for that particular point.

In step 1924, a scatter plot is generated for each of the plurality of channels based upon the scatter plot data that was generated in step 1922. These steps may be combined without departing from the scope of the invention. In addition, if only one or some of the plurality of channels are having distortion corrected, then a scatter plot may only be generated for those channels being corrected. Again, as discussed above, the scatter plots generated in this embodiment of the invention include points proportional to the distortion of the channel for which the scatter plot is being created versus each of the other channels. However, distortion relative to a subset of the additional channels could be used without departing from the scope of the invention.

Figure 21:
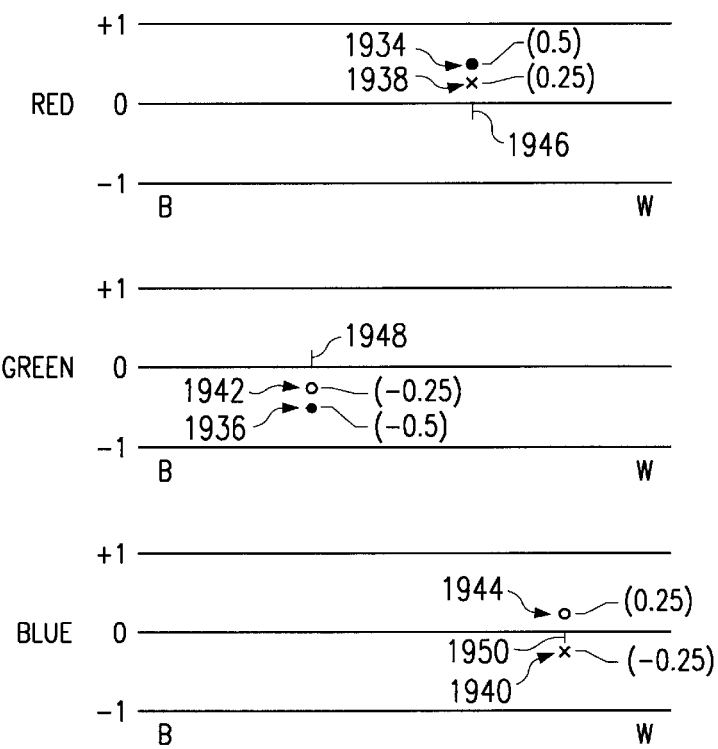
FIG. 21 illustrates examples of three scatter plots that may be used in connection with the process illustrated in FIG. 19 or FIG. 20.

FIG. 21 illustrates six points that may be plotted that correspond to a single spatial location in the image. For the red scatter plot, the intensity of the pixel in question determines the x-axis index 1946 for each of the two points. The y-axis index for point 1934 is determined by formula 79. The weight that will be assigned to point 1934 is determined by formula 85. Here, formula 79 produced a y-index value of 0.5. Because formula 81 turns out to be the negative of formula 79, the y-index for the corresponding point 1936 on the green scatter plot has a y-index of −0.5. The x-index of point 1936 was determined using formula 92 and represents the intensity of the pixel in question in the green channel. The weight produced for point 1936 by formula 87 will be the negative of the weight produced for point 1934 by formula 85. Accordingly, various implementations of the invention may simply use one set of formulas to calculate the weights such as formulas 85, 86, and 88 without departing from the scope of the invention.

Point 1938 again has an x-index determined by formula 91 for the pixel in question. Its y-index is determined by formula 80 and its weight is determined by formula 86. This point provides a measure of the distortion of the red signal when compared to the blue signal. The y-index for point 1940 on the blue scatter plot is the negative of the y-index of point 1938 as formula 83 is simply the negative of formula 80. The x-index 1950 for point 1940 corresponds to the intensity value in the blue channel for the pixel in question and is determined using formula 93.

Similarly, point 1942 on the green scatter plot and point 1944 on the blue scatter plot have y-axis indices which are the negatives of one another (additive inverses) as formula 84 is the negative of formula 82.

After the scatter plot has been generated in step 1924, a curve may be generated through the scatter plot using a curve-fitting algorithm as illustrated in step 1926. In this embodiment, an averaging type of curve-fitting algorithm is used. Any type of curve-fitting algorithm could be used without departing from the scope of the invention. A curve may be generated for each scatter plot. Presumably, a scatter plot will only be generated in step 1924 if distortion correction is being applied to the channel for which the scatter plot is being generated. If no distortion correction is being generated for a particular channel, then the generation of the scatter plot in step 1924 and generation of the curve in step 1926 may be omitted for that channel.

In step 1928, an inverse distortion function may be generated based upon the curves generated in step 1926. This inverse distortion function may be any function proportional to the curve generated in step 1926. The curve that was generated in step 1926 is proportional to the relative distortion of a particular signal versus one or more additional signals having a shared component. In this embodiment, the inverse distortion function for each channel may be generated using formulas 94–96.

$$FR[C] = \sum_{i=0}^{C} \sqrt[y-1]{\frac{1+R_i}{1-R_i}} \quad (94)$$

$$FG[C] = \sum_{i=0}^{C} \sqrt[y-1]{\frac{1+G_i}{1-G_i}} \quad (95)$$

$$FB[C] = \sum_{i=0}^{C} \sqrt[y-1]{\frac{1+B_i}{1-B_i}} \quad (96)$$

Formula 94 may be used for the red channel, formula 95 for the green channel and formula 96 for the blue channel. Because digital images are involved, a discreet number of intensity values may be used. For example, this embodiment employs an 8-bit intensity value which produces 256 different possible intensity values. Thus, the inverse distortion function comprises a look-up table of 256 values ranging from 0–255. Thus, "C" has a maximum value of 255 in formulas 94–96 where the digital image has a 256 possible intensity values. Other numbers of bits may be used without departing from the scope of the invention. The value "y" in formulas 94–96 represents the number of channels making up the digital image. The term $R_i$ in formula 94 represents the y-value of the curve that was generated in step 1926 for the red scatter plot for the x-axis index of "i" on the s. In other words, the curve that was generated through the scatter plot in step 1926 is a curve representing distortion plotted in response to pixel intensity. Formula 94 calculates an inverse distortion for each pixel intensity in question that is proportional to the area under the curve generated in step 1926 prior to the intensity in question. Formulas 95 and 96 are analogous to formula 94.

The y/y−1 root is used in Formulas 94–96 because overcorrection could otherwise result. Each channel's correction is based upon its distortion relative to the other channels. If a correction were made without taking this into account, the relative correction would be made for each channel assuming that only that channel was being corrected. Because each channel, in this example, is being corrected, a net overcorrection could result if the appropriate root were not taken.

In step 1930, each image channel may be normalized using the inverse distortion functions determined in step 1928. For normalization, each pixel intensity value in the image is processed. For a particular spatial location, the red intensity is changed by using the intensity of the red channel at that pixel as an index into the inverse distortion function that was generated using formula 94. The red intensity value is replaced by the intensity supplied by the inverse distortion function. Similarly, the green intensity value at a particular pixel is replaced by the green intensity value produced by the inverse distortion function for the green channel generated in step 1928 where the index to the inverse distortion function for the green channel comprises the current pixel intensity value for the green channel. Finally, the intensity value for the blue channel of the pixel is corrected analogously using the blue inverse distortion function that was generated in step 1928.

Although the inventions described herein involve calculations in both the spatial domain and spatial frequency domain, analogous calculations in the opposite domain could equivalently be used without departing from the scope of the invention.

Although the present invention has been described in detail, it should be understood that various changes, substitutions, and alterations can be made hereto without departing from the spirit and scope of the invention as defined by the appended claims.

To aid the Patent Office and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are used in the particular claim.

What is claimed is:

1. A method of automatically enhancing a digital image comprising the steps of:
   measuring magnitudes of grain traces in at least two segments in the digital image; and
   altering the digital image using the magnitudes of the grain traces measured in at least the two segments.

2. The method of claim 1, wherein the measurement of the grain traces further comprises measuring the magnitude of the grain traces as a function of intensity and deriving a function relating the magnitude of the grain traces to intensity.

3. The method of claim 2, wherein the step of measuring the magnitude of the grain traces is further characterized as measuring the magnitude of high frequency components of the grain traces.

4. The method of claim 2, wherein the measurement of the grain traces further comprises the step of subdividing the digital image into a plurality of segments, including at least a first and a second segment.

5. The method of claim 4, wherein the first and second segments overlap.

6. The method of claim 4, wherein the measurement of grain magnitude includes the step of measuring the grain magnitude in the first segment.

7. The method of claim 6, wherein the digital image within the first and second segments is further characterized as containing a mix of grain traces and image.

8. The method of claim 7, wherein the measurement of the grain traces further includes the step of segregating the grain traces from the image in spatial frequency.

9. The method of claim 7:
   wherein the first segment is further characterized as containing information from at least a first and second color channel; and
   wherein the measurement of grain traces is a function of the relationship between the color channels.

10. The method of claim 9, wherein the relationship between color channels includes a cross-correlation.

11. The method of claim 10:
    wherein the first and second segments have similar intensities; and
    wherein the segment with the lowest correlation is given a greater weight ascribed to that intensity.

12. The method of claim 10:
    wherein overall signal magnitude is the combination of image magnitude and grain trace magnitude; and
    wherein the magnitude of the correlation is functionally subtracted from the overall signal magnitude to provide an estimate of the portion of the signal magnitude ascribed to the magnitude of the grain traces.

13. The method of claim 2, wherein the step of enhancing the digital image further comprises the step of depriving a contrast curve to give substantially equal grain trace magnitudes for at least a selected first and second intensity.

14. The method of claim 13, wherein the step of deriving the contrast curve further includes the step of setting the contrast curve such that the ration of contrast between the first and second intensities is inversely proportional to the ratio of measured grain traces at the first and second intensity levels.

15. The method of claim 14:
    wherein the image is further characterized as containing information from a first and second color channel; and
    wherein a first and second contrast curve are separately derived based on the magnitude of the grain traces in the first and second color channels.

16. The method of claim 15, wherein the step of enhancing the digital image further comprises the step of reducing a perceived effect of the grain traces.

17. The method of claim 1, wherein the measurement of the grain traces further comprises measuring the magnitude of the grain traces as a function of frequency and deriving a function relating the magnitude of the grain traces to frequency.

18. The method of claim 17, wherein the measurement of the grain traces further comprises the step of subdividing the digital image into a plurality of segments, including at least a first and a second segment.

19. A method of claim 18, wherein the first and second segments overlap.

20. The method of claim 18:
    wherein the first and second segments have similar intensities; and
    wherein the measurement of grain strength for that intensity includes a weighted average of the first and second segments.

21. The method of claim 20, wherein the weighted average is a median.

22. The method of claim 20, wherein the weights of the first and second segments are inversely related to the measured grain trace magnitude of each segment.

23. The method of claim 20:
    wherein the first segment is further characterized as containing information from at least a first and second color channel; and
    wherein the measurement of grain traces is a function of the relationship between the color channels.

24. The method of claim 23, wherein the relationship between color channels includes a cross-correlation.

25. The method of claim 24, wherein the weighted average is an inversely proportional function of the cross-correlation.

26. The method of claim 17, wherein the step of enhancing the digital image further comprises the step of deriving a frequency boost curve to give substantially equal grain trace magnitudes for at least a selected first and second frequency.

27. The method of claim 26, wherein the step of deriving the frequency boost curve further includes the step of setting the frequency boost curve such that the ratio of boost between the first and second frequencies is inversely proportional to the ratio of measured grain traces at the first and second frequencies.

28. The method of claim 1, wherein the measurement of the grain traces further comprises measuring the magnitude of the grain traces as a function of intensity and frequency.

29. The method of claim 28, wherein the measurement of the grain traces further comprises the step of subdividing the digital image into a plurality of segments, including at least a first and a second segment.

30. The method of claim 29, wherein the first and second segments overlap.

31. The method of claim 29, wherein the measurement of grain magnitude includes the step of measuring the grain magnitude in the first segment.

32. The method of claim 31, wherein the digital image within the first and second segments is further characterized as containing a mix of grain traces and image.

33. The method of claim 32, wherein the measurement of the grain traces further includes the step of segregating the grain traces from the image in spatial frequency.

34. The method of claim 32:
wherein the first segment is further characterized as containing information from at least a first and second color channel; and
wherein the measurement of grain traces is a function of the relationship between the color channels.

35. The method of claim 34, wherein the relationship between color channels includes a cross-correlation.

36. The method of claim 35:
wherein the first and second segments have similar intensities; and
wherein the segment with the lowest cross-correlation is given the greater weight ascribed to that intensity.

37. The method of claim 35:
wherein overall signal magnitude is the combination of image magnitude and grain trace magnitude; and
wherein the magnitude of the correlation is functionally subtracted from the overall signal magnitude to provide an estimate of the portion of the signal magnitude ascribed to the magnitude of the grain traces.

38. A method of determining grain characteristics of a silver halide film that has been digitally scanned, said film containing at least one image, comprising the steps of:
segmenting at least a portion of said image into a plurality of regions, each region containing data corresponding to a different spatial area of said scanned negative image, there being a sufficient plurality of regions to enable a representative approximation of different grain trace magnitudes represented on said silver halide negative film for a density range of interest;
removing image data relating to image detail from each of said regions to obtain a plurality of grain highlighted regions;
determining a regional average grain trace magnitude for each of said plurality of grain highlighted regions; and
obtaining a representative grain trace magnitude for said density range of interest within said silver halide film based upon said regional average grain density of certain ones of said grain highlighted regions.

39. A method according to claim 38, wherein each of said certain ones of said grain highlighted regions have an average density that is within said density range of interest.

40. A method according to claim 39, wherein said density range of interest is variable, such that the more of said certain ones of said grain highlighted regions that exist for a density range, the narrower said density range of interest will be.

41. A method according to claim 39 wherein said step of obtaining said representative grain trace magnitude obtains an average of the regional average grain trace magnitudes for grain highlighted regions having said average density within said density range of interest.

42. A method according to claim 38, further comprising the step of applying said representative grain trace magnitude to certain other grain highlighted regions within said portion of said negative image, said certain other grain highlighted regions having a density similar to that of said density range of interest.

43. A method according to claim 38, further comprising the step of applying said representative grain trace magnitude to certain other grain highlighted regions outside of said portion of said negative image, said certain other grain highlighted regions having grain traces similar to that of said density range of interest.

44. A method according to claim 38, wherein said step of obtaining obtains a plurality of representative grain trace magnitudes, each of said obtained plurality of obtained representative grain trace magnitudes corresponding to a different density range of interest.

45. A method according to claim 44, wherein each of said obtained representative grain trace magnitudes are based upon said regional average grain trace magnitudes whose corresponding grain highlighted region has a density corresponding to an associated one of said different density ranges of interest.

46. A method according to claim 45 wherein none of said different density ranges of interest overlap with each other.

47. A method according to claim 45 wherein certain ones of said corresponding density ranges of interest overlap, such that higher densities within a first density range overlap with lower densities within a second density range.

48. A digital image scanning system comprising:
scanning hardware operable to scan a photographic image and convert the photographic image into a digital image; and
computer software associated with the scanning hardware and operable to:
measure magnitudes of grain traces in at least two segments of the digital image; and
alter the digital image using the magnitudes of the grain traces measured in at least the two segments.

49. The digital image scanning system of claim 48, wherein the measurement of the magnitudes of grain traces further comprises measuring the magnitude of the grain traces as a function of intensity and deriving a function relating the magnitude of the grain traces to intensity.

50. The digital image scanning system of claim 49, wherein the software is further operable to alter the digital image by deriving a contrast curve to give substantially equal grain trace magnitudes for at least a selected first and second intensity levels.

51. The digital image scanning system of claim 50, wherein the deriving the contrast curve further includes the step of setting the contrast curve such that the ratio of contrast between the first and second intensities is inversely proportional to the ratio of measured grain traces at the first and second intensity levels.

52. The digital image scanning system of claim 51:
wherein the image is further characterized as containing information from a first and second color channel; and
wherein a first and second contrast curve are separately derived based on the magnitude of the grain traces in the first and second color channels.

53. The digital image scanning system of claim 49, wherein the step of measuring the magnitudes of the grain traces is further characterized as measuring the magnitude of the high frequency components of the grain traces.

54. The digital image scanning system of claim 49, wherein the measurement of the magnitude of the grain traces further comprises subdividing the digital image into a plurality of segments, including at least a first and a second segment.

55. The digital image scanning system of claim 54, wherein the measurement of the magnitudes of the grain traces further comprises segregating the grain traces from the image in spatial frequency.

56. The digital image scanning system of claim 54:
wherein the first segment is further characterized as containing information from at least a first and second color channel, and;
wherein the measurement of grain traces is a function of the relationship between the color channels.

57. The digital image scanning system of claim 56, wherein the relationship between color channels includes a cross-correlation.

58. The digital image scanning system of claim 57:
wherein overall signal magnitude is the combination of image magnitude and grain trace magnitude; and
wherein the magnitude of the correlation is functionally subtracted from the overall signal magnitude to provide an estimate of the portion of the signal magnitude ascribed to the magnitude of the grain traces.

59. The digital image scanning system of claim 48, wherein the measurement of the magnitudes of the grain traces further comprises measuring the magnitude of the grain traces as a function of frequency and deriving a function relating the magnitude of the grain traces to frequency.

60. The digital image scanning system of claim 48, wherein the measurement of the magnitudes of the grain traces further comprises measuring the magnitude of the grain traces as a function of intensity and frequency.

61. The digital image scanning system of claim 60, wherein the measurement of the grain traces further comprises the step of subdividing the digital image into a plurality of segments, including at least a first and a second segment.

62. The digital image scanning system of claim 61:
wherein the first segment is further characterized as containing information from at least a first and second color channel; and
wherein the measurement of the magnitudes of grain traces is a function of the relationship between the color channels.

63. The digital image scanning system of claim 62, wherein the relationship between color channels includes a cross-correlation.

64. The digital image scanning system of claim 63:
wherein overall signal magnitude is the combination of image magnitude and grain trace magnitude; and
wherein the magnitude of the correlation is functionally subtracted from the overall signal magnitude to provide an estimate of the portion of the signal magnitude ascribed to the magnitude of the grain traces.

65. The method of claim 60, wherein the software is further operable to derive a frequency boost curve to give substantially equal grain trace magnitudes for at least a selected first and second frequency.

66. A digital image processing system comprising:
a computer readable storage medium; and
computer software stored on the computer readable storage medium and operable to:
measure the magnitudes of grain traces in at least two segments of a digital image; and
alter the digital image using the magnitudes of the grain traces measured in at least the two segments.

67. The digital image scanning system of claim 66, wherein the measurement of the magnitudes of grain traces further comprises measuring the magnitude of the grain traces as a function of intensity and deriving a function relating the magnitude of the grain traces to intensity.

68. The digital image scanning system of claim 67, wherein the step of measuring the magnitudes of the grain traces is further characterized as measuring the magnitude of high frequency components of the grain traces.

69. The digital image scanning system of claim 67, wherein the measurement of the magnitude of the grain traces further comprises subdividing the digital image into a plurality of segments, including at least a first and a second segment.

70. The digital image scanning system of claim 69, wherein the measurement of the magnitudes of the grain traces further comprises segregating the grain traces from the image in spatial frequency.

71. The digital image scanning system of claim 69:
wherein the first segment is further characterized as containing information from at least a first and second color channel; and
wherein the measurement of grain traces is a function of the relationship between the color channels.

72. The digital image scanning system of claim 71, wherein the relationship between color channels includes a cross-correlation.

73. The digital image scanning system of claim 72:
wherein overall signal magnitude is the combination of image magnitude and grain trace magnitude; and
wherein the magnitude of the correlation is functionally subtracted from the overall signal magnitude to provide an estimate of the portion of the signal magnitude ascribed to the magnitude of the grain traces.

74. The digital image scanning system of claim 67, wherein the software is further operable to alter the digital image by deriving a contrast curve to give substantially equal grain trace magnitudes for at least a selected first and second intensity levels.

75. The digital image scanning system of claim 74, wherein the deriving the contrast curve further includes the step of setting the contrast curve such that the ratio of contrast between the first and second intensities is inversely proportional to the ratio of measured grain traces at the first and second intensity levels.

76. The digital image scanning system of claim 75:
wherein the image is further characterized as containing information from a first and second color channel; and
wherein a first and second contrast curve are separately derived based on the magnitude of the grain traces in the first and second color channels.

77. The digital image scanning system of claim 66, wherein the measurement of the magnitudes of the grain traces further comprises measuring the magnitude of the grain traces as a function of frequency and deriving a function relating the magnitude of the grain traces to frequency.

78. The digital image scanning system of claim 66, wherein the measurement of the magnitudes of the grain traces further comprises measuring the magnitude of the grain traces as a function of intensity and frequency.

79. The digital image scanning system of claim 78, wherein the measurement of the grain traces further comprises the step of subdividing the digital image into a plurality of segments, including at least a first and a second segment.

80. The digital image scanning system of claim 79:
wherein the first segment is further characterized as containing information from at least a first and second color channel; and wherein the measurement of the magnitudes of grain traces is a function of the relationship between the color channels.

81. The digital image scanning system of claim 80, wherein the relationship between color channels includes a cross-correlation.

82. The digital image scanning system of claim 81:

wherein overall signal magnitude is the combination of image magnitude and grain trace magnitude; and wherein the magnitude of the correlation is functionally subtracted from the overall signal magnitude to provide an estimate of the portion of the signal magnitude ascribed to the magnitude of the grain traces.

83. The method of claim 78, wherein the software is further operable to derive a frequency boost curve to give substantially equal grain trace magnitudes for at least a selected first and second frequency.

* * * * *